(12) United States Patent
Kikkawa et al.

(10) Patent No.: US 8,782,170 B2
(45) Date of Patent: Jul. 15, 2014

(54) INFORMATION PROCESSING APPARATUS, INFORMATION PROCESSING METHOD, AND COMPUTER PROGRAM

(75) Inventors: Norifumi Kikkawa, Tokyo (JP); Yasuaki Honda, Chiba (JP); Noriyuki Sakoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 1808 days.

(21) Appl. No.: 10/550,510

(22) PCT Filed: Mar. 17, 2004

(86) PCT No.: PCT/JP2004/003580
§ 371 (c)(1),
(2), (4) Date: Sep. 23, 2005

(87) PCT Pub. No.: WO2004/086355
PCT Pub. Date: Oct. 7, 2004

(65) Prior Publication Data
US 2006/0294212 A1 Dec. 28, 2006

(30) Foreign Application Priority Data
Mar. 27, 2003 (JP) .................. P2003-088009

(51) Int. Cl.
*G06F 15/16* (2006.01)
*G06F 17/00* (2006.01)

(52) U.S. Cl.
USPC .......................................... 709/219

(58) Field of Classification Search
USPC ............................................ 709/219
See application file for complete search history.

(56) References Cited

U.S. PATENT DOCUMENTS

| | | | | | |
|---|---|---|---|---|---|
| 5,526,480 | A | * | 6/1996 | Gibson | 715/210 |
| 5,553,221 | A | * | 9/1996 | Reimer et al. | 715/720 |
| 5,903,264 | A | * | 5/1999 | Moeller et al. | 715/719 |
| 6,038,368 | A | * | 3/2000 | Boetje et al. | 386/52 |
| 6,310,625 | B1 | * | 10/2001 | Yoshio et al. | 345/473 |

(Continued)

FOREIGN PATENT DOCUMENTS

| | | |
|---|---|---|
| CA | 2 324 856 | 5/2001 |
| CA | 2 324 856 A1 | 5/2001 |

(Continued)

OTHER PUBLICATIONS

Communication from the Japanese Patent Office for Japanese Patent Application No. 2003-088009, dated Oct. 23, 2006, 5 pages.

(Continued)

*Primary Examiner* — Michael Chao
(74) *Attorney, Agent, or Firm* — Finnegan, Henderson, Farabow, Garrett & Dunner, L.L.P.

(57) ABSTRACT

An apparatus and method that, in transmission and playback of content between a server and a client, efficiently executes playing back part of content, such as an impressive portion, is provided. By setting index information as partial data region identification information in property information corresponding to content retained by the server, when a content request from the client includes partial playback specification information, the index information is acquired from the property information corresponding to the specified content, and the content is acquired and transmitted to the client. This configuration enables the client to enjoy playback of content of only particular partial data such as an impressive portion of content received from a server or a user's favorite portion.

16 Claims, 20 Drawing Sheets

(56) References Cited

U.S. PATENT DOCUMENTS

| | | | |
|---|---|---|---|
| 6,370,316 B1 * | 4/2002 | Yamada et al. | 386/230 |
| 6,637,031 B1 * | 10/2003 | Chou | 725/87 |
| 6,760,536 B1 * | 7/2004 | Amir et al. | 386/68 |
| 6,829,781 B1 * | 12/2004 | Bhagavath et al. | 725/94 |
| 7,207,006 B1 * | 4/2007 | Feig et al. | 715/723 |
| 2001/0033296 A1 * | 10/2001 | Fullerton et al. | 345/730 |
| 2002/0056095 A1 * | 5/2002 | Uehara et al. | 725/38 |
| 2002/0078439 A1 | 6/2002 | Yamaga | |
| 2003/0037331 A1 * | 2/2003 | Lee | 725/32 |
| 2003/0046437 A1 * | 3/2003 | Eytchison et al. | 709/250 |
| 2003/0095790 A1 * | 5/2003 | Joshi | 386/69 |
| 2003/0110503 A1 * | 6/2003 | Perkes | 725/86 |
| 2003/0174160 A1 * | 9/2003 | Deutscher et al. | 345/716 |
| 2004/0096199 A1 * | 5/2004 | Chou et al. | 386/125 |
| 2004/0125124 A1 * | 7/2004 | Kim et al. | 345/716 |
| 2004/0128317 A1 * | 7/2004 | Sull et al. | 707/104.1 |

FOREIGN PATENT DOCUMENTS

| | | |
|---|---|---|
| JP | 2001-142495 | 5/2001 |
| JP | 2001-306834 | 11/2001 |
| JP | 2001-318681 | 11/2001 |
| JP | 2002-182661 | 6/2002 |
| JP | 2002-251494 | 9/2002 |
| JP | 2002-290389 | 10/2002 |

OTHER PUBLICATIONS

Kobayashi Nagako, "Shin-hasso no Data-Warehouse (New Thinking Data Warehouse)", Nikkei Computer, Japan, Nikkei Business Publications, Inc., Feb. 16, 1998, Issue: 437, p. 132-138.

Supplementary European Search Report from European Patent Office dated Aug. 27, 2008, Application No. 04721330.1-1225/ 1607937, 3 pages.

Kobayashi Nagako, "Shin-hasso no Data-Warehouse (New Thinking Data Warehouse)", Nikkei Computer, Japan, Nikkei Business Publications, Inc., Feb. 16, 1998, Issue: 437, pp. 132-138.

European Patent Office communication pursuant to Article 94(3) EPC in Application No. 04 721 330.1-1225, dated Mar. 12, 2012, 7 pgs.

* cited by examiner

| Class Name | Description |
| --- | --- |
| avmusicTrack | Music |
| avMusicAlbum | Album<br>It has avMusicTrack as a subclass. |
| avMusicGenre | Each genre of "List of Genres"<br>It has auMusicArtist or avMusicAlbum or avMusicTrack as a subclass. |
| avMusicArtist | Each artist of "List of Artists"<br>It has avMusicAlbum or avMusicTrack as a subclass. |
| avMusicPlaylist | Playlist in "List of Playlists" container<br>It has, as a subclass, avMusicTrack, which is included in the playlist. |
| avMusicSearchavMusicSearch | Server-automatically-generated playlist in "Various Searches"<br>It has, as a subclass, avMusicTrack, which is included in the playlist. |
| avMusicPlaylistFolder | Playlist container<br>It has avMusicPlaylistFolder or avMusicPlaylist as a subclass.<br>The reason that playlistContainer is not inherited is to avoid confliction with avMusicPlaylist in character-string matching. |
| avMusicAlbumCabinet | Album cabinet<br>It has avMusicAlbum as a subclass. |
| avAllavAllMusicTracks | "All Pieces of Music" container<br>avMusicTrack as a subclass |
| avAllavAllMusicAlbums | "List of Albums" container<br>avMusicAlbum as a subclass |
| avAllavAllMusicArtists | "List of Artistis" container<br>avMusicArtis as a subclass |
| avAllavAllMusicGenre | "List of Genres" container<br>avMusicGenre as a subclass |
| avAllavAllMusicPlaylists | "List of Playlists" container<br>avMusicPlaylist or avMusicPlaylistFolder as a subclass |
| avAllMusicSearch | "Various Searches" container<br>avMusicSearchavMusicSearch as a subclass |
| avAllMusicAlbumCabinets | "List of Album Cabinets" container<br>avMusicAlbumCabine as a subclass |

| CONTENT No. | TITLE | ARTIST NAME | ⋮ | ⋮ |
|---|---|---|---|---|
| 0001 | Abc··ffg | Csde··fddd | | |
| 0002 | | | | |
| | | | | |
| | | | | |

| Property Name | Type | Multiple | Property Description |
|---|---|---|---|
| av:totalSize | unsigned long | no | Size (original size) of resources included in a container. It may be even an approximate value. Byte unit. |
| av:totalDuration | duration | no | Total time of resources included in a container. It may be even an approximate value. |
| av:recordQualityLevel | integer | no | Quality level of content. {1,2,3,4,5,6,7} In the case of video, 3: 2 Mbps; 4: 4 Mbps; 5: 8 Mbps for standard. The values are not strictly set. When quality levels of plural res's differ, the highest level is set. (For each res, res@av:recordQualityLevel is set) |
| index-start-position information av:indexStartPosition | duration | no | Positional information of partial data (impressive portion). (temporal position or data position from content-start position) |
| index-region information av:indexDuration | duration | no | Region information of partial data (impressive portion). (temporal or data-region information from index-start position) |

410

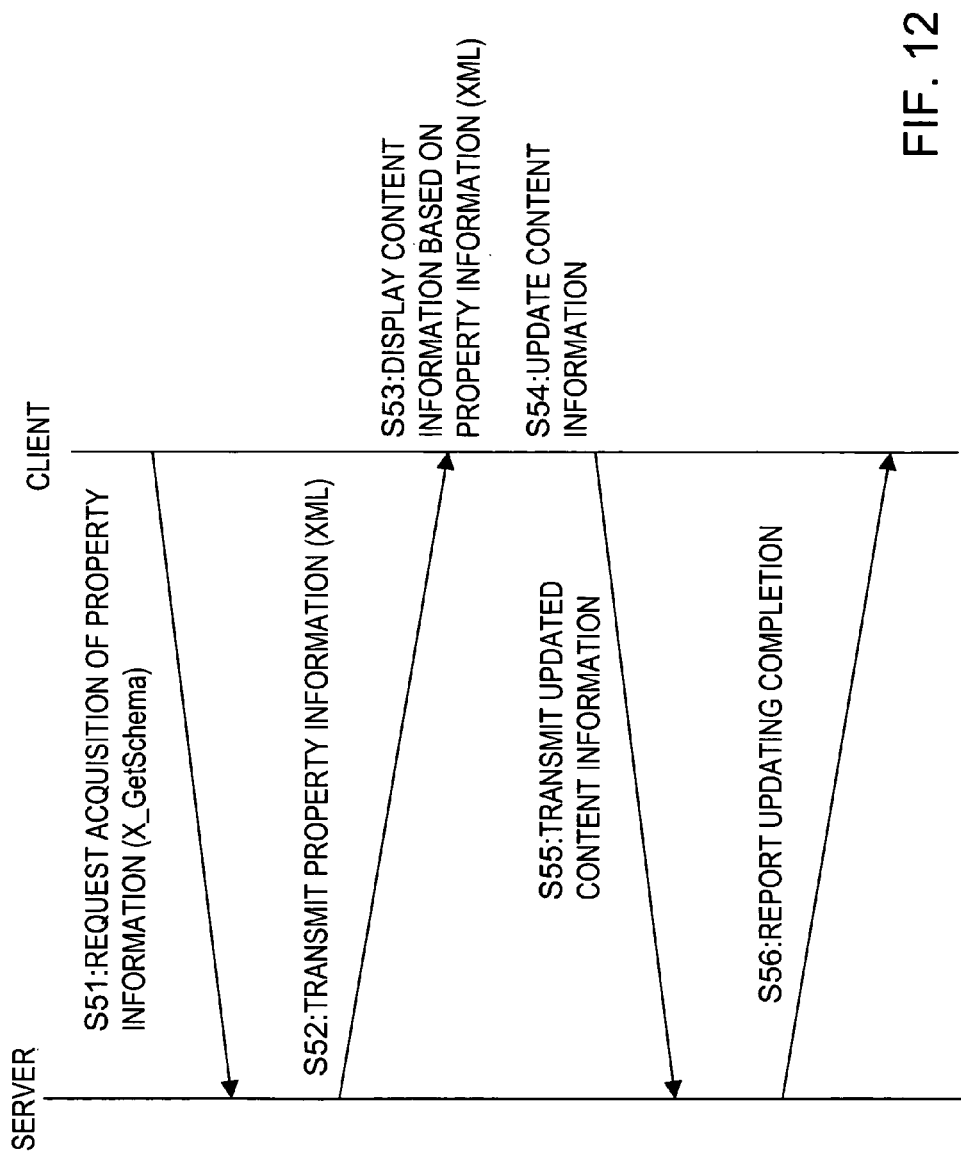
FIF. 12

```xml
<?xml version="1.0">
<av:PropertiesInfo xmlns:av ="urn:schemas-sony-com:av">
    <av:PropertyInfo>
        <av:PropertyName>dc:title</av:PropertyName>
        <av:MinOccurred>1</av:MinOccurred>
        <av:MaxOccurred>1</av:MaxOccurred>
        <av:OperationCode>rcw</av:OperationCode>
    </av:PropertyInfo>
    ...
    <av:PropertyInfo>
        <av:PropertyName>upnp:artist</av:PropertyName>
        <av:MinOccurred>0</av:MinOccurred>
        <av:MaxOccurred>1</av:MaxOccurred>
        <av:OperationCode>rcwad</av:OperationCode>
    </av:PropertyInfo>
    ...
    <av:PropertyInfo>
        <av:PropertyName>av:recordQualityLevel</av:PropertyName>
        <av:MinOccurred>1</av:MinOccurred>
        <av:MaxOccurred>1</av:MaxOccurred>
        <av:OperationCode>rcw</av:OperationCode>
        <av:AllowedValueRange>
                <av:Minimum>3</av:Minimum>
                <av:Maximum>5</av:Maximum>
                <av:Step>1</av:Step>
        </av:AllowedValueRange>
    </av:PropertyInfo>
    ...
    <av:PropertyInfo>
        <av:PropertyName>av:recordStatus</av:PropertyName>
        <av:MinOccurred>1</av:MinOccurred>
        <av:MaxOccurred>1</av:MaxOccurred>
        <av:OperationCode>r</av:OperationCode>
        <av:AllowedValueList>
                <av:AllowedValue>NotYet</av:AllowedValue>
                <av:AllowedValue>Timed</av:AllowedValue>
                <av:AllowedValue>Recording</av:AllowedValue>
                <av:AllowedValue>Recorded</av:AllowedValue>
        </av:AllowedValueList>
    </av:PropertyInfo>
    ...
</av:PropertiesInfo >
```

- 471: dc:title PropertyInfo
- 472: upnp:artist PropertyInfo
- 473: av:recordQualityLevel PropertyInfo
- 474: av:recordStatus PropertyInfo

FIG. 13

| | | | |
|---|---|---|---|
| av:PropertyName | string | dc:title | Property name (write for each namespace, such as SortCriteria) |
| av:MinOccurred | unsigned integer | 1 | In the server, regarding one object in the specified class, the minimum number of properties that must exist. |
| av:MaxOccurred | unsigned integer | 1 | In the server, regarding one object in the specified class, the maximum number of properties that can exist. No limit causes no tag. |
| av:OperationCode | formatted string | rwc | Among the following characters, corresponding characters are arranged:<br>c: Specifiable in CreateObject mode<br>w: Rewrittable with UpdateObject<br>a: Increasable with UpdateObject<br>d: Erasable with UpdateObject<br>s: Includable in SortCriteria with Browse/Search |
| av:AllowedValueList | - | - | Specified when a list of possible values of the property.<br>No limit in possible values both in AllowedValueRange and this property.<br>When the type of property is CSV, patterns are listed one by one, and all the patterns do not need to be listed.<br>The values are listed as values of AllowedValue. |
| av:AllowedValue | depends on property | PLAY | Possible value |
| av:AllowedValueRange | - | - | Specified when some limitation lies in the range of possible value of the property.<br>No limit in possible values both in AllowedValueList and this property.<br>The range |
| av:Minimum | depends on property | 1 | The minimum value of the property.<br>No minimum value needs no tag. |
| av:Maximum | depends on property | 1 | The maximum value of the property.<br>No maximum value needs no tag. |
| av:Step | depends on property | 1 | If a possible value is determined at predetermined intervals, the interval is shown here. If not, no tag is used. |

| CONTENT No. | TITLE | INDEX-START-POSITION INFORMATION | INDEX-REGION INFORMATION | ... | ... |
|---|---|---|---|---|---|
| 0001 | Abc··ffg | 00:25:34 | 00:12:51 | | VALUES 1,2,3 |
| 0002 | | | | | |
| | | | | | |

481 — TITLE
482 — ...
483 — ...
485 — INDEX-START-POSITION INFORMATION
486 — INDEX-REGION INFORMATION

484:
- NotYet
- Timed
- Recording
- Recorded

INFORMATION PROCESSING APPARATUS, INFORMATION PROCESSING METHOD, AND COMPUTER PROGRAM

CROSS REFERENCE TO RELATED APPLICATIONS

This application is a national phase application based on PCT/JP2004/003580, filed Mar. 17, 2004, the content of which is incorporated herein by reference, and claims the right to priority based on Japanese Application No. 2003-088009, filed Mar. 27, 2003, the content of which is incorporated herein by reference.

TECHNICAL FIELD

The present invention relates to information processing apparatuses, information processing methods, and computer programs. More specifically, the present invention relates to an information processing apparatus and information processing method in which, when a client executes playing back content retained by a content providing server, partial data, such as a content's characteristic portion such as an impressive portion in audio data, is extracted, transmitted, and played back in the client, and to a computer program.

BACKGROUND ART

With the widespread use of data communication networks in recent years, even in homes, so-called home networks are becoming used in each of which, by connecting, to a network, electric household devices, a computer, and peripheral devices, communication between devices can be established. In the home networks, data processing functions of network-connected devices are shared such that the devices communicate with one another, and the devices transmit and receive content to one another, whereby convenience and comfort are provided to a user. Accordingly, it is predicted that the home networks are increasingly becoming widespread.

As a protocol suitable in the configuration of such a home network, Universal Plug and Play (UPnP) is known. The Universal Plug and Play (UPnP) enables facilitated establishment of a network without requiring a complex operation, and enables network-connected devices to receive a service provided by each device without requiring a difficult operation and setting. In addition, UPnP has an advantage in that it is independent from an OS (operating system) in a device and it enables facilitated addition of devices.

In UPnP, connected devices perform mutual recognition by exchanging definition files based on the XML (eXtensible Markup Language). An outline of UPnP processing is as follows:

(1) addressing that acquires a self-device ID such as an IP address;

(2) discovering which searches for each device on the network, receives a response from the device, and acquires information, such as a device type and a function, included in the response; and (3) service requesting that, based on the information acquired by the discovering, requests a service from the device.

Implementation of the above process enables provision and reception of a service using a network-connected device. A device connected to the network uses the addressing to acquire a device ID, uses the discovering to acquire information of a different network-connected device, and can request a service from the different device based on the acquired information.

For example, when a device on a client side plays back content, such as music data and image data, stored in a server, the client acquires information concerning content retained by the server. The server stores the content in a storage unit and also stores attribute information for the stored content. The attribute information includes, for example, titles of music and movie as content, an artist name, a date and time of recording, and, in addition, information concerning a compression form of data. These pieces of the attribute information are called metainformation.

For example, when the device on the client side needs to play back content, such as music data and image data, stored in the server, the device on the client side transmits, to the server, content information stored in the server, for example, a music or movie title, an artist name, data-compression-form information (such as ATRAC (adaptive transform acoustic coding) or MPEG (moving picture experts group)), and, in addition, a request to acquire various types of content attribute information such as copyright information, if needed.

In response to the request from the client, the server transmits, to the client, metadata (attribute information) concerning content retained by the server. Based on the metadata acquired from the server, the client displays content information on a display of the client device in accordance with a predetermined display program. For example, a playlist including artist names and titles, etc., are displayed on the display. Based on the displayed information, the user selects or confirms content to be played back, and transmits a content transmitting request to the server. After the server receives the content request from the client, transmission of content is performed from the server to the client, and the content is received and played back by the client.

The content stored as described above in the server can be searched for from a different network-connected device (client), and can be played back by specifying a particular piece of the content.

For example, when the client selects music content as what is to be played back, a content transmitting request including an identifier of the music content is transmitted, and the server acquires the specified content from a storage unit and transmits the acquired content to the client. The transmitted content is played back. In a typical form of transmitting and receiving content data of the above type, the transmission and reception are executed basically in units of one piece of content or a set of plural pieces of content.

However, a client user has a case in which a desired piece of music for listening cannot always be specified based on general content information such as a title and an artist. As for so-called music, there are many cases in which, by listening to a characteristic melody portion such as a "transitional" portion, a piece of music can be identified. In addition, there is a case in which the user wishes to listen to only a characteristic portion or only a user's favorite melody portion without playing back all music content. For example, there are many users who wish to perform content playback in which only impressive portions are extracted from plural pieces of music content and are consecutively played back.

Many current systems in each of which content is stored in a home server, or the like, and a client makes a content transmitting request to the home server by specifying the content, a server can perform only content-unit transmission, but cannot perform the above content delivery such as extracting only data of user's favorite portions from server-stored content and transmitting the data to the client.

Patent Document 1 (Japanese Unexamined Patent Application Publication No. 2001-142495) includes a description concerning a configuration in which index information is set as management information for music content and in which specific content-portion-region specifying information is set. However, although, in the configuration in this Patent Document 1, one content playback processor manages and uses index information, Patent Document 1 does not represent a server-client system, that is, a configuration in which content is stored in a server and the content is provided from the server to a client in response to a request from the client.

In a current server-client system, a content request from a client is made by specifying content-identification information, and content transmission from a server is executed based on the content-identification information from the client. Therefore, extraction and transmission, by the server, of data in response to a partial content request concerning only a user's favorite portion are not realized.

DISCLOSURE OF INVENTION

The present invention has been made in view of the above problems, and is intended to provide an information processing apparatus and information processing method in which, when a client executes playback of content retained by a content providing server, partial data, such as a characteristic content portion such as an impressive portion of audio data, is extracted, transmitted, and played back in the client, and a computer program.

A first aspect of the present invention provides an information processing apparatus for executing content transmission that includes:

a storage unit which stores content and property information as content-attribute information;

a data transmitting/receiving unit which executes data transmission and reception with a client as a content-information requesting device; and a content extracting unit which, in response to a content request from the client, executes acquiring requested content from the storage unit, wherein:

the property information includes index information as partial-content-region identification information; and the content extracting unit is configured to execute acquiring partial content data specified by the index information on the condition that the content request from the client includes partial playback specification, and to execute transmitting the partial content data to the client.

In addition, in an embodiment of the information processing apparatus of the present invention, the index information includes: index-start-position information representing, as start-position information of the partial content data, information of a time or a data amount from the start of the content; and index-region information, as region information of partial content data, representing a time or data amount from the index-start position; and the content extracting unit is configured to execute acquiring partial content data specified by the index-start-position information and the index-region-information.

Furthermore, in an embodiment of the information processing apparatus of the present invention, the information processing apparatus further comprises a content-information generating unit which, based on the property information, generates content information to be transmitted to the client, and the content-information generating unit is configured to execute acquiring index information from property information corresponding to the requested content on the condition a content request from the client includes partial playback specification, and transmitting the acquired index information.

Furthermore, in an embodiment of the information processing apparatus of the present invention, the information processing apparatus further comprises a content-information generating unit which, based on the property information, content information to be transmitted to the client, and the content-information generating unit is configured to execute generating the content information by defining, for each property, data editing information allowable for each piece of the property information, and transmitting the generated information to the client.

Furthermore, in an embodiment of the present invention, the data editing information includes information which sets permission of at least one of rewriting, addition, and deletion of the property information.

In addition, a second aspect of the present invention provides an information processing apparatus for performing acquiring content that comprises:

a data transmitting/receiving unit which executes data transmission and reception with a server retaining the content;

a content requesting unit which generates, as content request data to the server, content request data including partial content playback information; and a content playback control unit which executes controlling playback of partial content received from the server through the data transmitting/receiving unit.

Furthermore, in an embodiment of the information processing apparatus of the present invention, the information processing apparatus further comprises a content-information analyzing unit which executes analyzing property information corresponding to content received from the server and generating display information, and a display unit which displays the display information generated by the content-information analyzing unit, the content-information analyzing unit is configured to execute generating, based on index information included in the content information received from the server, display information in which an index region of the content is recognizable, and to output the display information on the display unit.

Furthermore, in an embodiment of the information processing apparatus of the present invention, the information processing apparatus further comprises a content-information analyzing unit which executes analyzing property information corresponding to content received from the server and generating display information, and a display unit which displays the display information generated by the content-information analyzing unit, and the content-information analyzing unit is configured to execute generating display information in which data editing information is recognizable for each piece of property information as a component of content information received from the server.

Furthermore, a third aspect of the present invention provides an information processing method for executing content transmission, comprising:

a step of receiving a content request from a client;

a step of determining whether or not partial playback specification is included in the content request from the client;

a step of executing, on the condition that the partial playback specification is included in the content request from the client, acquiring index information as partial-content-region identification information from the property information as content attribute information;

a step of executing acquiring partial content data specified by the index information; and a step of transmitting the extracted partial content data to the client.

Furthermore, in an embodiment of the information processing method of the present invention, the index information includes index-start-position information representing, as start-position information of the partial content data, information of a time or a data amount from the start of the content, and index-region information, as region information of partial content data, representing a time or data amount from the index-start position, and the content extracting step executes acquiring partial content data specified by the index-start-position information and the index-region information.

Furthermore, in an embodiment of the information processing method of the present invention, the information processing method further comprises a step of, on the condition that a content request includes partial playback specification, acquiring index information from property information corresponding to the requested content from the client, and transmitting the acquired information to the client.

Furthermore, in an embodiment of the information processing method of the present invention, the information processing method further comprises a step of executing generating the content information by defining, for each property, data editing information allowable for each piece of the property information, and transmitting the generated information to the client.

Furthermore, in an embodiment of the present invention, the data editing information includes information which sets permission of at least one of rewriting, addition, and deletion of the property information.

Furthermore, a fourth aspect of the present invention provides an information processing method for performing acquiring content that comprises:

a content requesting step of generating, content request data, content request data including partial-content-playback request information, and transmitting the data to a server; and a content playback control step of executing controlling playback of partial content received from the server.

Furthermore, in an embodiment of the information processing method of the present invention, the information processing method further comprises a content-information analyzing step of executing analyzing property information corresponding to content received from the server and generating display information, and a display step of displaying the display information generated in the content-information analyzing step, and the content-information analyzing step executes generating, based on index information included in the content information received from the server, display information in which an index region of the content is recognizable, and outputs the display information to the display unit.

Furthermore, in an embodiment of the information processing method of the present invention, the information processing method further comprises a content-information analyzing step of executing analyzing property information corresponding to content received from the server and generating display information, and a display step of displaying the display information generated in the content-information analyzing step, the content-information analyzing step executes generating display information in which data editing information is recognizable for each piece of property information as a component of content information received from the server.

Furthermore, a fifth aspect of the present invention provides a computer program for executing content transmission that comprises:

a step of receiving a content request from a client;

a step of determining whether or not partial playback specification is included in the content request from the client;

a step of executing, on the condition that the partial playback specification is included in the content request from the client, acquiring index information as partial-content-region identification information from the property information as content attribute information;

a step of executing acquiring partial content data specified by the index information; and a step of transmitting the extracted partial content data to the client.

Furthermore, a sixth aspect of the present invention provides a computer program for performing acquiring content that comprises:

a content requesting step of generating, content request data, content request data including partial-content-playback request information, and transmitting the data to a server; and a content playback control step of executing controlling playback of partial content received from the server.

According to the configuration in the present invention, by executing partially extracting content data based on index information included in property information of content by the server on the basis of a partial content playback request from the client, the extracted partial content data is transmitted to the client. Thus, the client can enjoy content playback of particular partial data such as an impressive portion of content received from the server, or user's favorite portion.

Furthermore, according to the configuration in the present invention, index information of content is set in property information corresponding to content retained by a server, and, in accordance with partial playback specifying information set in a content request from a client, the index information is acquired from the property information corresponding to the specified content, and partial content is transmitted to the client after being acquired. Thus, processing loads on the client and the server are substantially similar to those in normal content transmission, thus enabling efficient partial content playback.

Furthermore, according to the configuration in the present invention, data editing information allowable for each piece of property information is set for each property and the data editing information is transmitted, whereby, in the client, editing of the property information based on received information can be performed, and an arbitrary data region, such as a user's favorite portion, can be set as index information. Thus, partial content playback in an arbitrary region can be executed.

The computer program of the present invention can be provided in computer-readable form to a multipurpose computer system capable of executing various types of program code by recording media, communication media, for example, storage media such as CD, FD, and MO, or communication media such as a network. By providing the above program in computer-readable form, processing in accordance with the program is realized in a computer system.

Further objects, features, and advantages of the present invention will become apparent by a more detailed description based on the following embodiments of the present invention and the accompanying drawings. In addition, the system in this specification is the configuration of a logical set

BRIEF DESCRIPTION OF THE DRAWINGS

FIG. 4 is a table showing examples of management classes of content retained in a server.

FIG. 6 is an illustration of an example of a content information list displayed on a display on the basis of XML data including property information transmitted from a server to a client.

FIG. 9 is a table illustrating property information corresponding to content retained by a server.

FIG. 12 is an illustration of a processing sequence between a server and a client in property information updating.

FIG. 13 is an illustration of an example of the configuration of XML data including property information transmitted from a server to a client.

FIG. 14 is a table illustrating the configuration of property information constituting metadata set correspondingly to content data.

FIG. 15 is an illustration of an example of a content information list displayed based on XML data including property information transmitted from a server to a client.

BEST MODE FOR CARRYING OUT THE INVENTION

Details of an information processing apparatus, information processing method, and computer program of the present invention are described below with reference to the drawings.

System Outline

Figure 1:
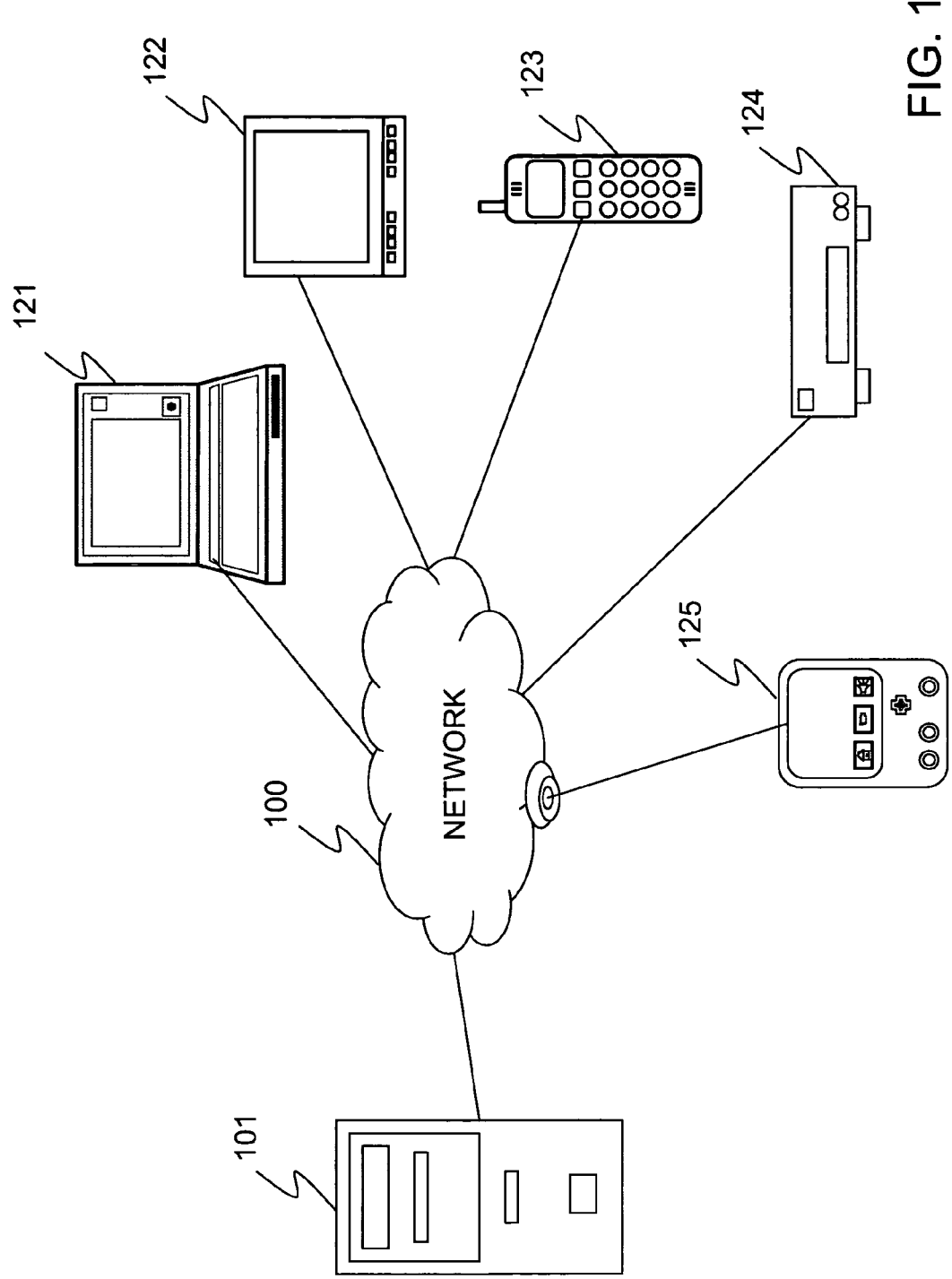
FIG. 1 is an illustration of an example of a network to which the present invention is applicable.

At first, an example of the configuration of a network to which the present invention is applicable is described with reference to FIG. 1. FIG. 1 shows a configuration, for example, a home network configuration, in which a server 101 that executes processing in response to various client apparatuses, a PC 121 as a client apparatus that requests processing from the server 101, a monitor 122, a cellular phone 123, a player 124, and a PDA 125 are connected to one another by a network 100. In addition, various electronic equipment and electric home equipment can be connected as client apparatuses.

Processing that the server 101 executes in response to a request from the client includes, for example, providing content stored in a storage means, such as a hard disk, of the server 101, or a data processing service by executing a server-executable application program. Although FIG. 1 shows the server 101 and the client apparatus, with them distinguished from each other, an apparatus that provides a service in response to a request from the client is shown as a server, and, when any client apparatus provides its data processing service to another client, it becomes capable of providing functions for a server. Therefore, also the network-connected client apparatuses can become servers.

The network 100 is one of wired and wireless networks, and each connected apparatus uses the network 100 to transmit and receive communication packets such as, for example, Ethernet (registered trademark) frames. In other words, the client executes a data processing request from the server 101 by transmitting, to the server 101, a frame in which processing request information is stored in a data portion of an Ethernet frame. The server 101 executes data processing in response to reception of the processing request frame, stores result data as a data processing result in a data portion of a communication packet, if necessary, and transmits the packet to each client.

The network-connected apparatuses are formed by, for example, Universal Plug and Play (UPnP) enabled apparatuses. Accordingly, in the configuration, network-connected apparatuses are easily added and deleted. A new apparatus that is connected to the network can receive services using the network-connected apparatuses by performing:

(1) addressing that acquires its device ID such as an IP address;

(2) discovering which searches for each device on the network, receives a response from the device, and acquires information, such as a device type and a function, included in the response; and (3) service requesting that, based on the information acquired by the discovering, requests a service form the device.

As an example of information processing apparatuses forming the server and client apparatuses shown in FIG. 1, an example of the hardware configuration of the PC is described with reference to FIG. 2.

A CPU (Central Processing Unit) 201 functions as a data processing means or a communication controlling means by executing various types of processing in accordance with programs stored in a ROM (Read Only Memory) 202, an HDD 204, or the like. A RAM 203 stores programs and data that the CPU 201 executes, if needed. The CPU 201, the ROM 202, the RAM 203, and the HDD 204 are connected to one another by a bus 205.

The bus 205 connects to an input/output interface 206. The input/output interface 206 connects to, for example, an input unit 207 including a keyboard, switches, buttons, and a mouse which are operated by a user, and an output unit 208 including an LCD, CRT, and speaker for providing the user with various types of information. In addition, a communication unit 209 that functions as a data transmitting/receiving means, and a drive 210 in which a removable recording medium 211, such as a magnetic disk, an optical disc, a magneto-optical disc, or a semiconductor memory can be loaded, and which executes reading or writing data in the removable recording medium 211.

Figure 2:
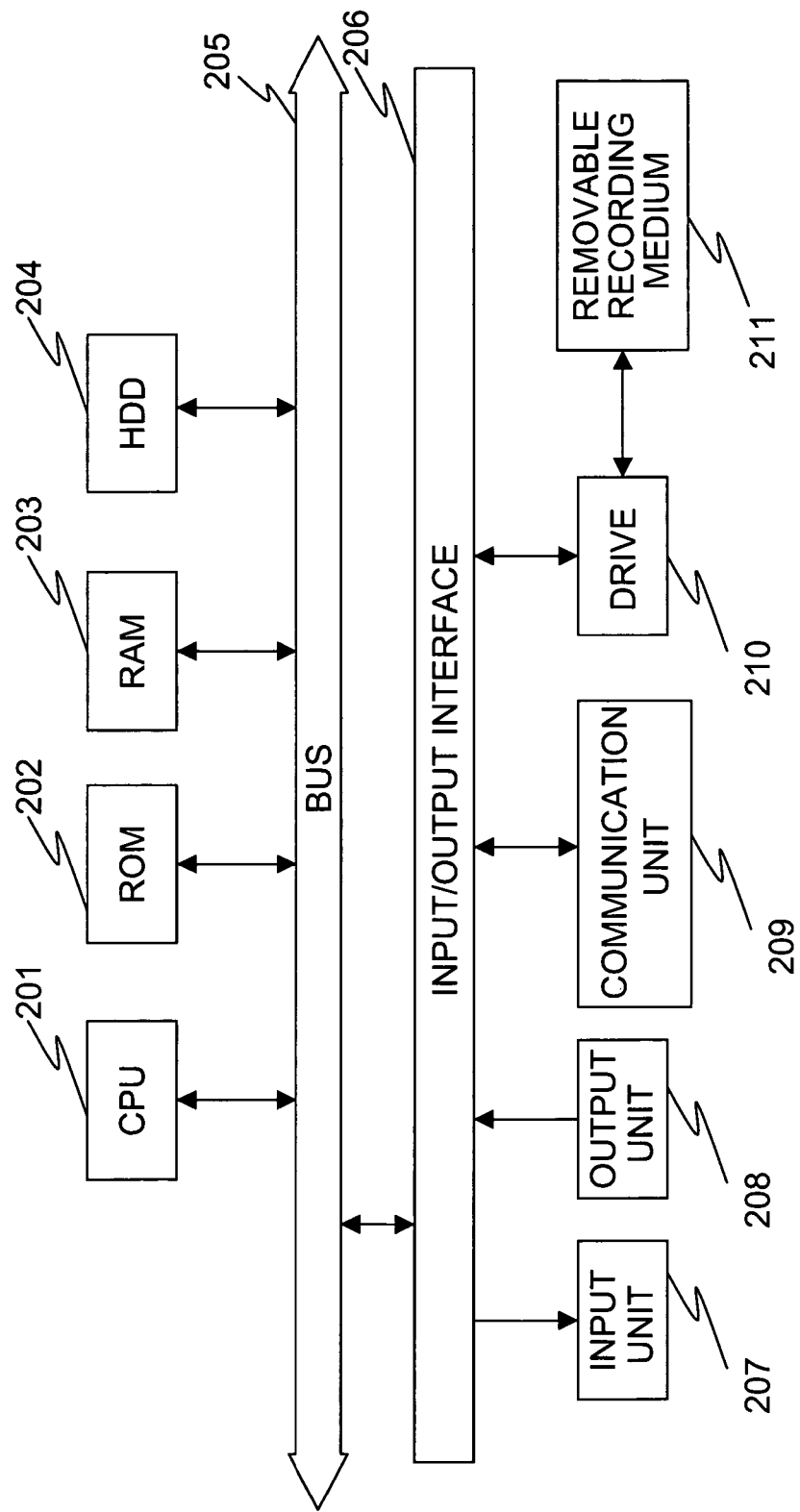
FIG. 2 is a diagram illustrating an example of the configuration of network-connected devices.

The configuration shown in FIG. 2 is an example of the server, a personal computer (PC), as an example of a network-connected apparatus. Network-connected apparatuses are not limited to PCs, but may be a cellular phone, a portable communication terminal such as a PDA, and, in addition, various electronic apparatuses such as a player and a display, and an information processing apparatus, as shown in FIG. 1. Accordingly, each apparatus can have its own hardware configuration and executes processing in accordance with the hardware.

Metadata

Next, metadata retained by a server storing content to be provided to a client is described. The server retains, as metadata, attribute information corresponding to pieces of content, such as picture data such as still pictures and video, and audio data such as music, stored in its storage unit. Components of the metadata are called property information.

The content, such as picture data such as still pictures and video, and audio data such as music, retained by the server, is collectively called AV content. In the server, the AV content is managed by content directories having a hierarchical configuration.

The content directories have a hierarchical configuration formed by folders storing a single piece of AV content or plural pieces of AV content. Each component of the content directories, that is, each of the folders storing a single piece of AV content or plural pieces of AV content is called the object. The object is a generic name of data units processed by the server. In addition to the folders storing the single or plural pieces of AV content, there are various objects.

In addition, a set of objects is called a container. Units of sets can be variously set such as, for example, a set based on physical storage positions of objects, a set based on logical relationship of objects, and a set based on a category. The smallest unit of the AV content, that is, each of one music data item, one video data item, etc., is called an item.

The objects are classified, based on the types thereof, into classes, such as, for example, audio, video, and photo, and are labeled corresponding to the classes. The client can specify, for example, a particular class, and can request and execute "searching" for only objects belonging to a particular classification. In addition, by specifying object in a particular folder or the like, the client can request "browsing" that requests only information concerning the folder, and can acquiring information concerning the particular folder. Since, in the server, also the classes are managed in hierarchical configuration, subclasses can be set in one class.

Metadata is various types of management information including attribute information corresponding to content retained in the server, class-definition information, and information concerning a hierarchical configuration constituting content directories. Metadata that is content-attribute information defined so as to be associated with each object includes various types of information such as a content identifier (ID), a data size, resource information, a title, an artist name, and copyright information. Each piece of information included in metadata is called property. It is determined beforehand that each of the above classes, such as music (audio), video, and photograph, has metadata having a type of property.

Content Playback Process by Client

For example, a client that attempts to play back content can request content from a sever and can receive and play back the requested content from the server. A common process of content playback is described with reference to FIG. 3. At first, in step S11, the client requests acquisition of content retained by the server. In step S12, in response to the request of the client, based on metadata corresponding to the content, the server generates content information, such as a title and an artist name, by using XML (extended Markup Language) data, and transmits the information to the client.

In step S13, the client displays, on a display, content information in accordance with received XML information. For, for example, music content, the content information is displayed as a list including music titles corresponding to plural pieces of music retained by the server, artist names, and playback times.

Next, in step S14, the client selects a piece of music that is received from the server and played back in the client apparatus, and transmits content specifying information (e.g., content ID) to the server. Based on received content specifying information, the server acquires content from a storage means, and transmits the content. In step S16, the client plays back the content received from the server. When the content is processed by compression such as ATRAC or MPEG, after it is decoded by the client, it is played back.

An ordinary content playback process is as described above. The client can acquire various types of content attribute information, that is, property information included in metadata corresponding to the content retained by the server, can display, for the user, an UI, such as a content list, based on the property information, and can select and request a piece of content from the server.

Figure 3:
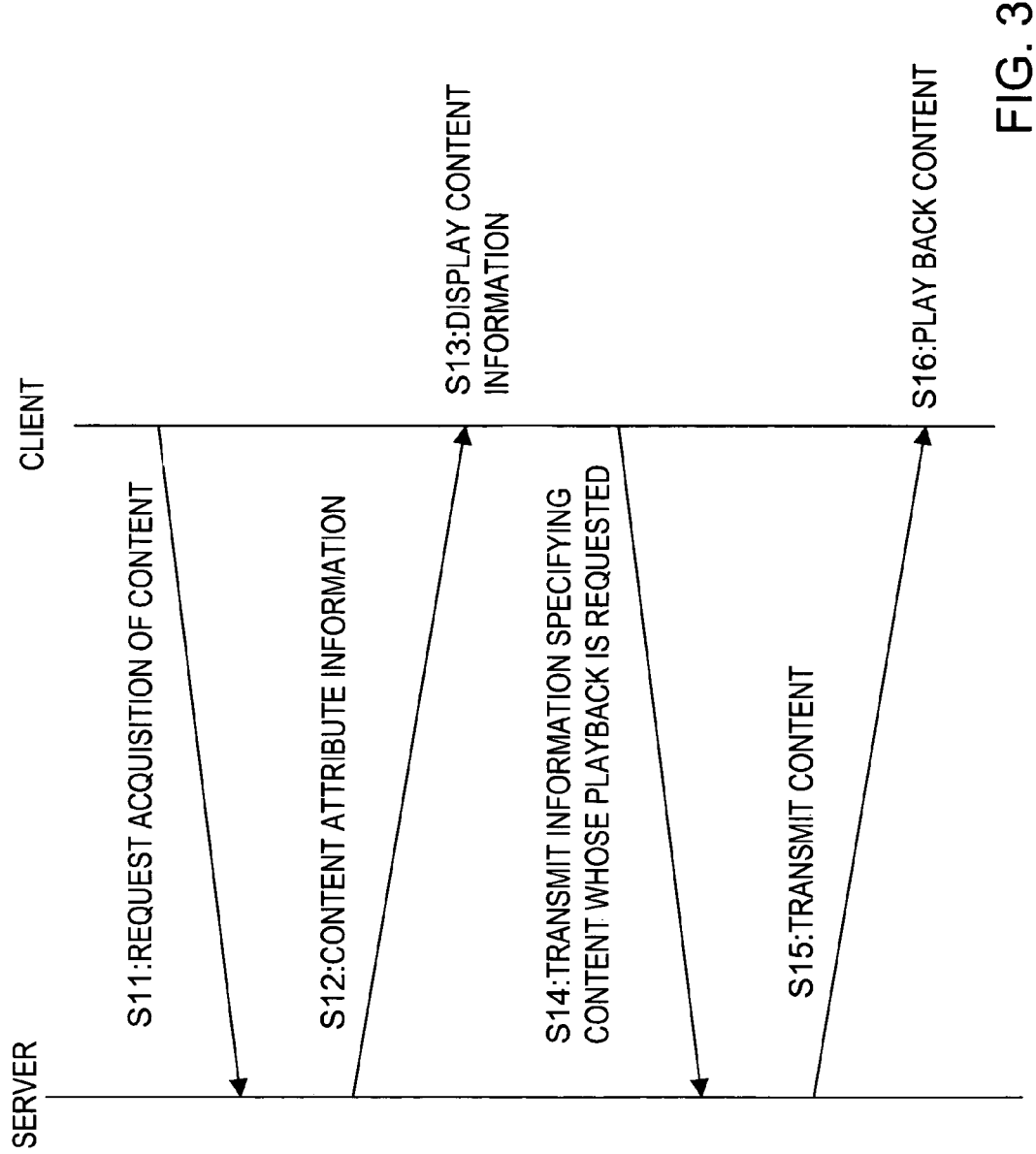
FIG. 3 is an illustration of a processing sequence between a server and a client in content data playback processing.

By using processing in the step S11 shown in FIG. 3, that is, content searching or so-called searching in which, when the client acquires content information retained in the server, the client requests content information in which, for example, a title includes "Christmas" as a word, particular content information can be selected and acquired. Alternatively, by specifying a particular folder, for example, a folder generated by collecting only user's favorite pieces of music, or a folder containing plural pieces of music corresponding to particular artists, genres, etc., content information of plural pieces of content contained in the folder can be acquired.

As described-above, in the server, objects as management content are managed in a form classifying the objects into classes based on their types, for example, music (audio), video, photo, etc., and, in addition, based on various categories (types). The classes are managed in hierarchical configuration.

Examples of management classes in the server are shown in FIG. 4. The examples shown in FIG. 4 are examples of music-content-related classes. As shown in FIG. 4, various classes, such as music, an album, a genre, and an album cabinet formed by collecting plural albums, are set, and the server manages metadata as content and content attribute information in each class, and property information.

Figure 5:
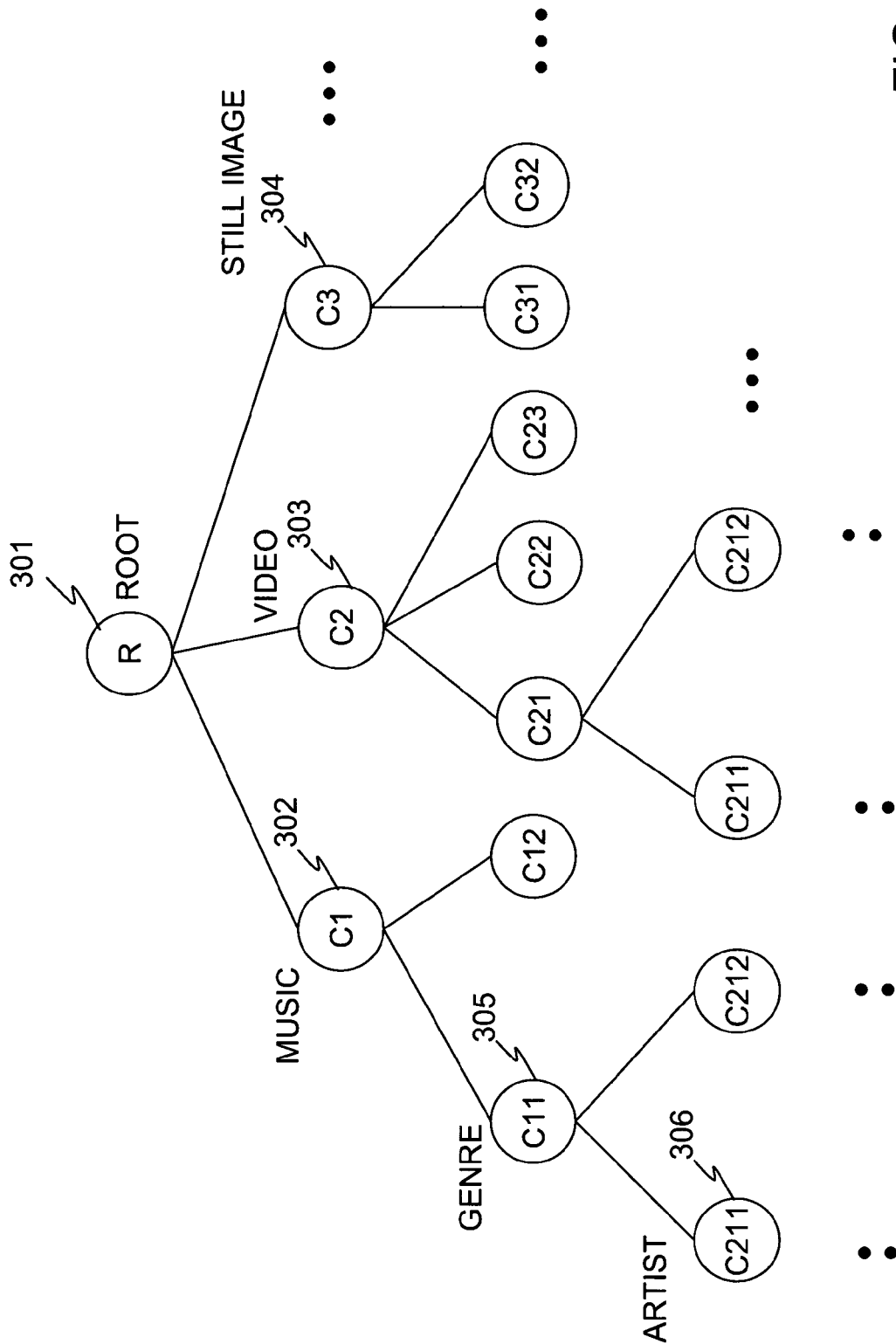
FIG. 5 is an illustration of a layer configuration of set classes in a server.

An example of the hierarchical configuration of the classes managed by the server is shown in FIG. 5. The hierarchical configuration can be shown in the form of a branching tree. Each circle shown in FIG. 5 corresponds to each class. This hierarchical configuration represents a logical management configuration corresponding to pieces of content that are stored in the storage unit and are managed in the server. Metadata as attribute information is set correspondingly to each class.

The top level in FIG. 5 is called a root container 301. Below the root container, for example, a music class 302, a video class 303, a still picture class 304, etc., are set. Below the music class 303, a genre 305 is set, and, below the genre, classes such an artist 306 are set.

By specifying a class, the client that attempts to execute content searching can request and execute searching for only objects belonging to a particular classification. In addition, by specifying a particular object, for example, by specifying a folder containing plural pieces of content, information of content contained in the folder can be acquired. Based on XML data describing content information received from the server, the client displays the content information.

An example of a displayed content information list is shown in FIG. 6. In the example shown in FIG. 6, a content information list 357 that has a data configuration of listing content numbers, titles, artist names, etc., is displayed on a display 350.

These pieces of information are generated based on property information as a component of metadata corresponding to content managed by the server. The server acquires, based on a search or browsing request received from the client, property information in metadata that agrees with conditions, generates XML data based on the acquired property information, and transmits the data to the client.

The client receives XML data based on the property information, corresponding to the content, extracted by the server, generates the display data as shown in FIG. 6 based on the XML data, and displays the data on a display of the client.

A user on the client side selects, from the list, content to be played back, and transmits selected content information to the server, whereby content, that is, content various types, such as music, a movie, or photograph, is transmitted from the server, and its playback and output are executed on the client side.

Partial Content Playback Process

As described above, after the client selects content stored in the server by using browsing or searching, by specifying, for the server, content whose playback is requested, the client acquires the entity of the content, that is, music, an image, data, or the like, and the acquired one can be played back and output.

For example, in a common content playback process, when the client selects only one piece of music content as content to be played back, a content-transmission request including an identifier of the one piece of music content is transmitted to the server. The server acquires the specified piece of content from the storage unit and transmits the acquired piece to the client. The transmitted piece is played back and the process finishes.

However, as described in the section of the Related Art, There may be a case in which the user on the client side cannot always select desired music for listening on the basis of common content information such as a title or an artist. As for so-called music, there are many cases in which, by listening to a characteristic melody portion such as an "impressive portion", a piece of music can be identified. In addition, there is a case in which the user does not play back all music content but wishes to listen to only a characteristic portion or only a user's favorite melody portion. For example, there are many users who wish to perform content playback in which only impressive portions are extracted from plural pieces of music content and are consecutively played back.

The configuration in the present invention realizes content delivery in which partial data such as an impressive portion of music data, or partial data of only a favorite portion set by the user is extracted from server-stored content, and is transmitted to the client. Details of this configuration are described below.

A procedure in the case of executing the partial content playback process is described with reference to FIG. 7. At first, in step S31, the client executes acquiring content information from the server.

The client specifies a folder containing the content by performing searching or browsing, and requests acquiring content information by specifying, for example, a particular artist or a particular folder. The server generates XML data based on property information corresponding to content managed by the server, and transmits the data to the client in step S32.

After receiving the XML data from the server, in step S33, the client generates display data (see FIG. 6) based on the received XML data and displays the data on a display of the client.

In step S34, the client requests transmission of content based on the display data. At this time, the client requests content from the server in a form in which it adds both content identification information and partial playback specifying information.

Figure 8:
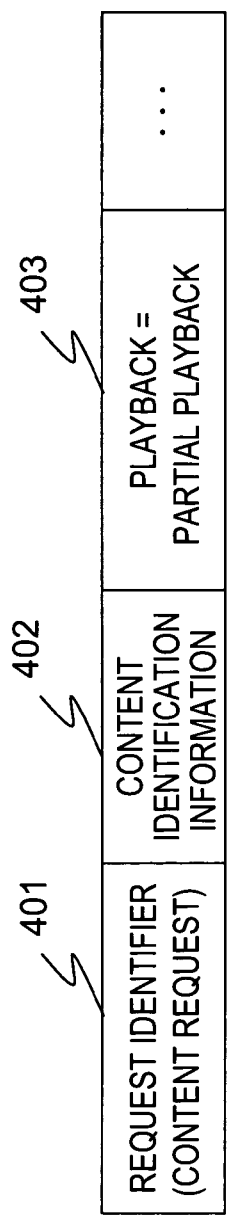
FIG. 8 is an illustration of the configuration of content requesting data that a client requests from a server in the case of executing partial playback of content.

FIG. 8 shows an example of the configuration of content request data transmitted from the client to the server. The transmitted data includes a request identifier 401 indicating that the request is a content request, a content identification information 402, playback specifying information 403 indicating that content playback is partial playback. For the content request data, for example, the HTTP (Hyper Text Transfer Protocol) GET method that is a content acquiring request having a set content URL can be used.

Although, in the playback specifying information 403, specification of playback of all content can be set other than specification of partial playback, when the specification of partial playback is not set in the playback specifying information 403, the server may perform processing in a form in which it is regarded that the specification of playback of all content is set.

Figure 7:
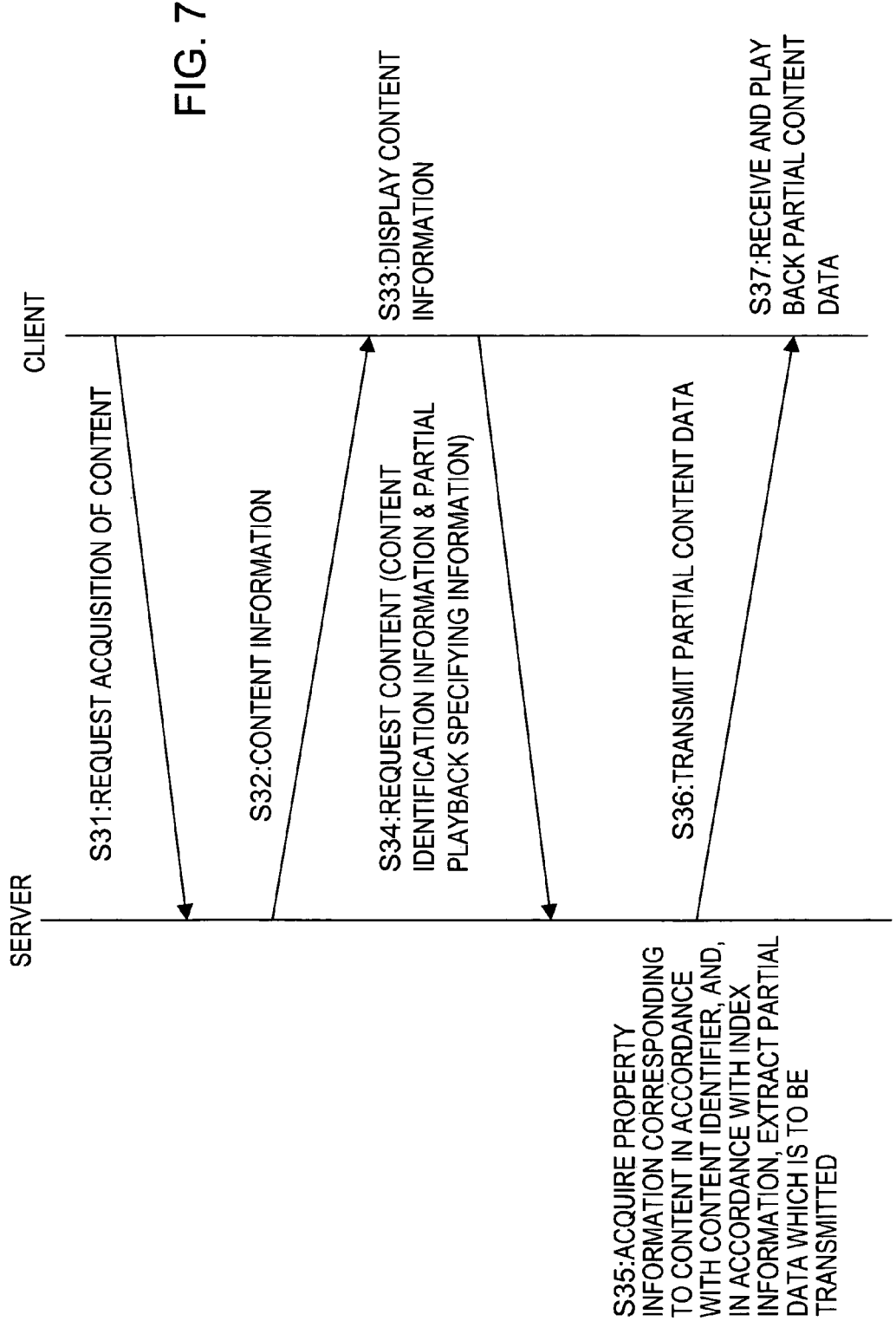
FIG. 7 is an illustration of a data communication sequence between a server and client in the case of executing partial playback of content.

Referring back to the sequence in FIG. 7, the description is continued. In step S34, the client transmits the content request that includes playback specifying information indicating that partial playback is desired for the content playback process. The server receives the content request. In step S35, the server acquires property information corresponding to the content specified by the client, and acquires index information set in the property information.

The server retains various type of property information as content attribute information. Attribute information concerning content data is metadata, and each component of the metadata is property information. Part of the property information is shown in FIG. 9.

FIG. 9 is an illustration showing an example of part of the property information held in the server correspondingly to the content retained in the server. FIG. 9 shows property names (Property Name), data types (Type) such as numerical values and character strings, multiples (Multiple) indicating whether a plurality can exit, and property descriptions (Property Description).

The totalSize shown in FIG. 9 represents size data of content. A container represents an object as a folder containing content. The totalDuration represents a total time of content. The recordQualityLevel is data representing a quality level that is recording quality of content. It has an integer value of 1 to 7, and is set such as 3=2 Mbps, 4=4 Mbps, and 5=8 Mbps. The index information data portion 410 shown in FIG. 9 is property information utilized in partial playback of content. The index-start-position information is information representing the start position of partial playback content in all the data of content, and, as this information, a value which represents a time up to the start position of partial data, or the amount of data is set. The index-region information is information representing a partial playback content region, and, as this information, a value that represents a time from the start position to end position of the partial playback content, or the amount of data is set.

Figure 10:
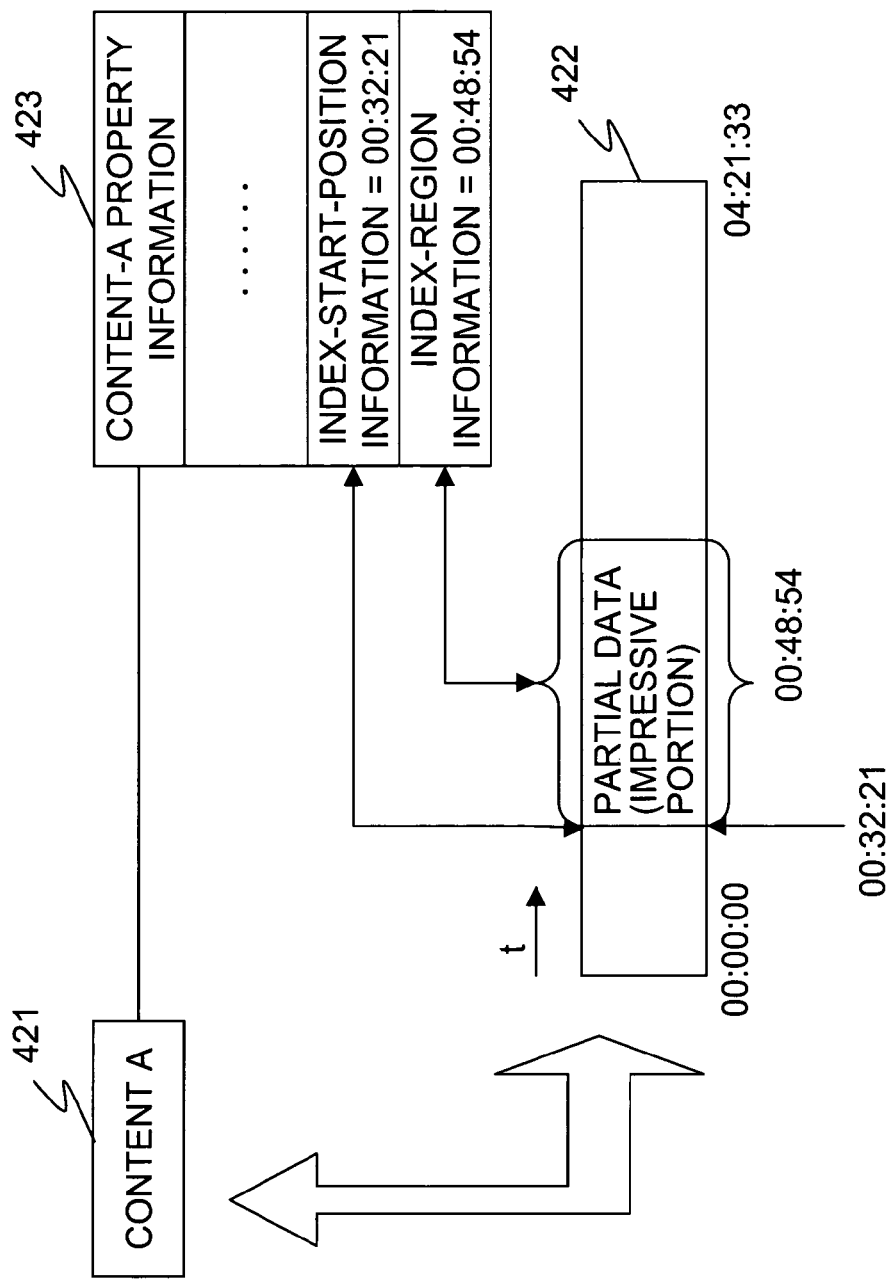
FIG. 10 is an illustration of index information in property information corresponding to content retained by a server.

A specific example of data setting is described with reference to FIG. 10. The example is described assuming content data 422 that is obtained by expanding content A (421) in time base t. When a total playback time of the content data is 4 minutes 21 seconds 33, a region of partial-data (impressive portion) is specified by the index-start-position information and index-region information defined in content-A property information 423.

The index-start-position information represents the start position of partial data (impressive portion), and, as this information, information of time from the start of content, 00 minutes 32 seconds 21, is set. The index-region information represents the time of partial data (impressive portion), and, as this information, 00 minutes 48 seconds 54 are set.

As described above, based on index information included in property information corresponding to content, that is, index-start-position information and index-region information, partial data in content is specified.

When the content request form the client includes specification of partial playback as described in FIG. 8, based on index information included in corresponding property information, that is, index-start-position information and index-region information, the server extracts corresponding partial data from content, and, in the step S36 in the sequence chart in FIG. 7, transmits the extracted partial content data to the client. In step S37, the client receives and plays back the partial content data from the server.

The server may be configured to generate and transmit, to the client, with content, as XML data, index information acquired from property information corresponding to content, that is, content property information including index-start-position information and index-region information.

Figure 11:
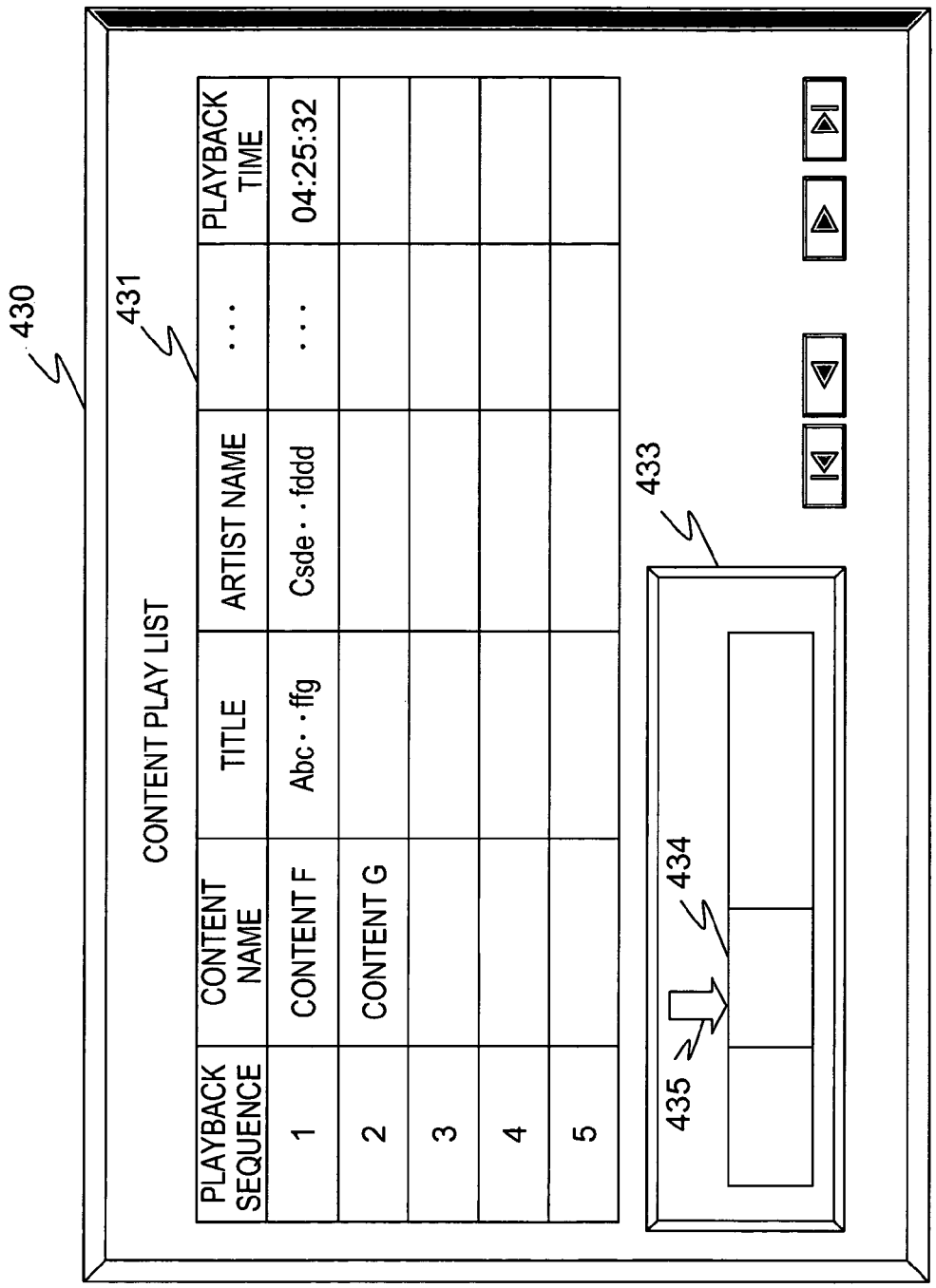
FIG. 11 is an illustration of an example of a content playback list and playback-start-position information.

Based on the index information received from the server, as shown in, for example, FIG. 11, the client displays, on a display 430, a content playlist 431 as a list of playback pieces of content, and content-playback-position information 433 indicating an index data region and a playback position. The client receives XML data including the index information, and generates and displays the display data as shown in FIG. 11 based on the received XML data.

FIG. 11 shows an example in which the content-playback-position information 433 indicates a partial data region 434 that is specified based on the index-start-position information and the index-region information, and playback-position information 435 that represents a playback position specified based on an elapse of time from a playback-start time. These pieces of information are display data that is generated by a display program of the client based on the information received from the server.

As described above, in the configuration in the present invention, on the condition that property information corresponding to content retained in the server includes index information, that is, index-start-position information and index-region information, and a content request from the client includes specification of partial playback, the index information is read from the property information corresponding to the content, and partial data of the content is extracted based on data included in the index information before being transmitted to the client. Thus, when part of certain content, or only an impressive portion needs to be listened to, the client can execute partial playback of the content by making a content request including specification of partial playback.

Editing of Index Information

The above index information is rewritable data, and its setting can be changed in a user's favorite portion. In the configuration in the present invention, in response to a content information request from the user, or the client, to the server, XML data is generated and transmitted to the client, the XML data including data editing information that is allowable for each piece of property information included in metadata corresponding to content, specifically, data editing information as various types of data-updating permission information including property-information rewriting, adding, and deletion permission, an input allowable data value, for example, a type of an allowable data format, and an allowable numerical value range, etc.

Based on the XML data including the property information received from the server, for each piece of the property information, the client generates display information (UI (user interface)) in which various types of editing information, such as permission concerning rewriting of the piece, a type of input allowable data, and a numerical value range of inputable data, can be recognized, and displays the display information, such as a content list, on the display. Therefore, the user can perform appropriate data updating based on content information, such as a content list, in which editing information can be recognized.

A consecutive sequence is described in which property information included in metadata as content attribute information is transmitted from the server to the client, content information based on the received information is displayed by the client, and a data updating process is executed.

A consecutive processing sequence in updating property information between the server and the client is shown in FIG. 12.

At first, in step S51, the client requests content information retained in the server. Here, the command "X_GETSchema" is transmitted to the server. The command "X_GETSchema" is a command that can be interpreted by devices constituting the system of the present invention. In response to the request, the server, which receives the command, generates and transmits, to the client, XML data based on property information forming metadata corresponding to various objects such as pieces of content.

When requesting the property information, the client can set acquisition of which object, that is, property information concerning a type of content. For example, from among the above classes such as music (audio), video, and photographs, one class is specified, and acquisition of property information of an object included in the specified class is requested. In this case, the command "X_GETSchema" is transmitted to the server, with a class name added to it.

After receiving the property information acquiring request from the client, the server acquires, from the storage means, for example, metadata corresponding to content corresponding to the specified class, and generates, based on the acquired metadata, XML data including property information to be transmitted to the client. In step S52, the server transmits the generated XML data to the client.

In the configuration in the present invention, in response to a content information request from the user or the client to the server, the server generates and transmits, to the client, for each piece of property information included in metadata corresponding to content, XML data including data editing information as various types of data updating permission information including permission of rewriting, addition, deletion, etc., of the property information, an input allowable data format, and an inputable data value.

Based on the XML data including the property information received from the server, the client machine generates, for each piece of the property information, generates a display screen (UI (user interface)) in which permission of rewriting, addition, deletion, etc., of the property information, an input allowable data format, an inputable data value, etc., can be recognized, and displays the screen as content information on the display. Therefore, content information, such as a content list, is displayed on the display, whereby the user can perform appropriate data updating.

FIG. 13 shows examples of XML data including plural pieces of property information included in the metadata corresponding to content which is transmitted from the server to the client. In the configuration in FIG. 13, each of data portions 471, 472, 473, and 474 is XML data concerning each piece of property information forming the metadata.

For example, the data portion 471 has the following configuration:

```
<av:PropertyInfo>
    <av:PropertyName>dc:title</av:PropertyName>
    <av:MinOccurred>1</av:MinOccurred>
    <av:MaxOccurred>1</av:MaxOccurred>
    <av:OperationCode>rcw</av:OperationCode>
</av:PropertyInfo>
```

Detailed meanings of descriptive data items of the XML data are shown in FIG. 14.

<av:PropertyInfo> represents the start of property information.

<av:PropertyName>dc:title</av:PropertyName> indicates that the name of property is "title".

<av:MinOccurred>1</av:MinOccurred> represents the minimum value of existence of this property information.

<av:Maxoccurred>1</av:MaxOccurred> represents the maximum value of existence of this property information. In the above case, it is indicated that the minimum number of the properties "title" is one and the maximum number of the properties "title" is one, in other words, it is indicated that one property "title" necessarily exists.

<av:OperationCode>rcw</av:OperationCode> is a processing code including editing information of this property information.

r: existence in an object, such as Browse and Search, that is sent back from the server;
c: specifiable in CreateObject mode;
w: rewritable with UpdateObject;
a: increasable with UpdateObject;
d: erasable with UpdateObject; and
s: includable with Browse/Search.

The above property "title" has <av:OperationCode>rcw</av:OperationCode> and setting [w].

Thus, it is data that is rewritable by the user in updating (UpdateObject). </av:PropertyInfo> represents the end of the property information.

The data portion 472 in FIG. 13 has the following configuration:

```
<av:PropertyInfo>
    <av:PropertyName>upnp:artist</av:PropertyName>
    <av:MinOccurred>0</av:MinOccurred>
    <av:MaxOccurred>1</av:MaxOccurred>
    <av:OperationCode>rcwad</av:OperationCode>
</av:PropertyInfo>
```

The above property information indicates that it has the property name "artist" and represents artist property information. In <av:OperationCode>rcwad</av:OperationCode>, "r, c, w, a, and d" are set. It is understood that, in updating (UpdateObject), the code is data rewritable by the user, and is increasable (a) or erasable (d).

The data portion 473 in FIG. 13 has the following configuration:

```
<av:PropertyInfo>
    <av:PropertyName>av:recordQualityLevel</av:PropertyName>
    <av:MinOccurred>1</av:MinOccurred>
    <av:MaxOccurred>1</av:MaxOccurred>
    <av:OperationCode>rcw</av:OperationCode>
    <av:AllowedValueRange>
    <av:Minimum>3</av:Minimum>
    <av:Maximum>5</av:Maximum>
    <av:Step>1</av:Step>
    </av:AllowedValueRange>
</av:PropertyInfo>
```

The above data represents the property "record quality level". In this data configuration,

```
<av:AllowedValueRange>
    <av:Minimum>3</av:Minimum>
    <av:Maximum>5</av:Maximum>
    <av:Step>1</av:Step>
</av:AllowedValueRange>
``` are data representing the range of possible values of the property "record quality level" and its step (interval). In other words, as the property "record quality level", a value of 3 to 5 can be set and its step is 1. Therefore, it is found that each of values 3, 4, and 5 can be set as "record quality level".

The data portion 474 in FIG. 13 has the following data configuration:

```
<av:PropertyInfo>
    <av:PropertyName>av:recordStatus</av:PropertyName>
    <av:MinOccurred>1</av:MinOccurred>
    <av:MaxOccurred>1</av:MaxOccurred>
    <av:OperationCode>r</av:OperationCode>
    <av:AllowedValueList>
        <av:AllowedValue>NotYet</av:AllowedValue>
        <av:AllowedValue>Timed</av:AllowedValue>
        <av:AllowedValue>Recording</av:AllowedValue>
        <av:AllowedValue>Recorded</av:AllowedValue>
    </av:AllowedValueList>
</av:PropertyInfo>
```

The above data relates to the property "record status (recordStatus)". In the above data,

```
<av:AllowedValueList>
    <av:AllowedValue>NotYet</av:AllowedValue>
    <av:AllowedValue>Timed</av:AllowedValue>
    <av:AllowedValue>Recording</av:AllowedValue>
    <av:AllowedValue>Recorded</av:AllowedValue>
</av:AllowedValueList>
``` are list data of possible values of the property "record status (recordStatus)". It is found that the property "record status (recordStatus)" can have four values NotYet, Timed, Recording, and Recording.

As described above, the property information transmitted from the server to the client includes a form in which it can be updated, and information concerning settable values.

Referring back to FIG. 12, the description of the processing sequence between the server and the client is continued. When, after the server transmits the above XML data shown in, for example, FIG. 13, the client receives the data, the client machine displays, on a display of the client machine, a content information list based on the XML data.

The displaying of the content information list executes list display based on a form in which updating can be performed and which is set for each piece of the above property information, and information concerning settable values. An example of the content information list is shown in FIG. 15.

For example, by using display setting for difference, such as setting a rewritable region to white and a disable region to gray or the like, the user can understand which field is rewritable. FIG. 15 shows one example. Accordingly, by using color display, rewritable, addable, and deletable fields may be set in different colors. Furthermore, by using not only colors but also various type of graphics processing an editable form of each field may be set so as to be recognizable.

For example, the field 481 shown in FIG. 15 is a rewritable property-information data field, and a field 482 is a property-information data field that is not allowed to be rewritten. In addition, in a property data field 483 in which settable values are defined, settable numerical values 1, 2, and 3 are shown. Furthermore, in a field 484 in which four values, NotYet, Timed, Recording, and Recording, are defined as settable values, displaying can be performed such as display of settable values in combo box form. This is executed in the client machine based on the XML data (see FIG. 13) received from the server.

The above index information of content, that is, index-start-position information and index-region information are set in rewritable property-information data-field form, as indicated by fields 485 and 486. Accordingly the user can set arbitrary data as index information in property information corresponding to content.

The form of displaying the content list, shown in FIG. 15, is one example. Various forms of display are possible other than this form of display. Definitely, editing information corresponding to each piece of property information received from the server, that is, pieces of information, such as rewriting permission, addition, deletion permission, an inputable data format, and settable values, are displayed in user-recognizable form. The displaying enables the user to perform efficient execution of accurate updating of data.

Referring back to the processing sequence between the server and the client in FIG. 12, the description is continued. Based on the property information (XML data) received from the server, in step S53, the client executes content information display (for example, FIG. 15), and executes data updating such as rewriting, addition, deletion, etc., of data in each field, if necessary.

In addition, in step S55, the property information including the updated data is transmitted to the server. The server stores the updated property information in its storage unit. In other words, by using the updated property information to update the metadata corresponding to content corresponding to the updated property information, updating of the metadata is performed. After the updating is completed in the server, in step S56, a updating completion report is transmitted to the client, and the updating of the property information is completed.

Figure 16:
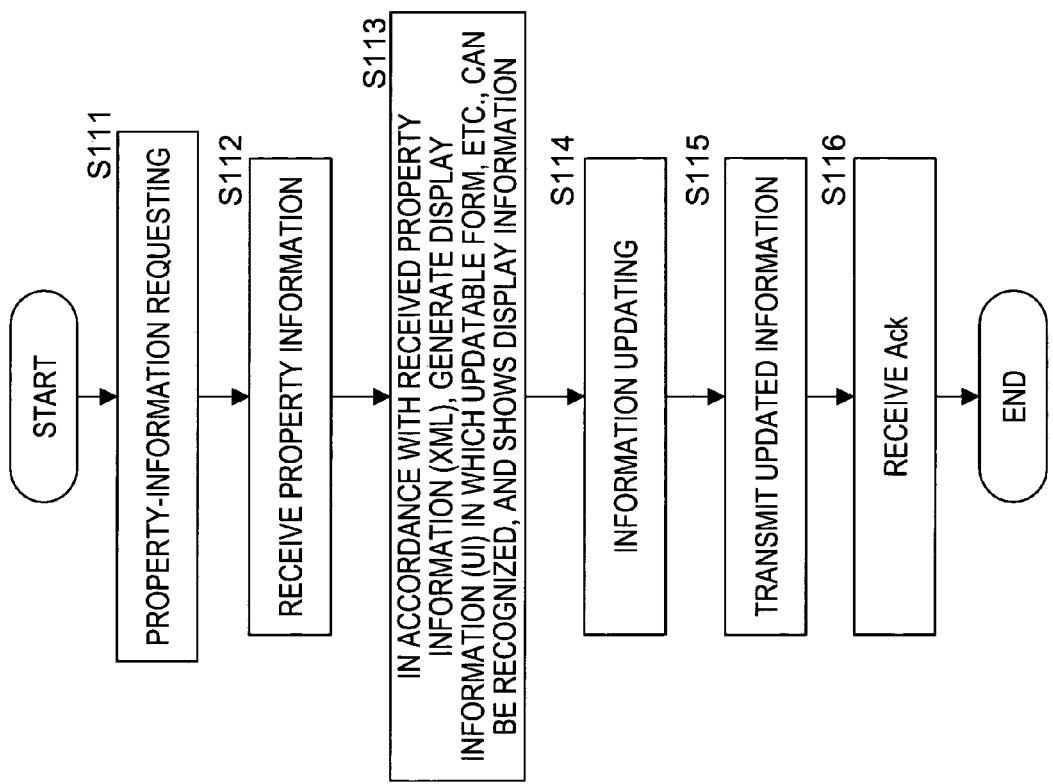
FIG. 16 is a flowchart illustrating a process of a client device in data updating on property information transmitted from a server to a client.

A property information acquiring process and updating procedure of the client apparatus are described with reference to FIG. 16.

In step S111, the client apparatus requests acquisition of property information from the server. This is executed as transmitting, to the server, for example, the command "X_GETSchema" having class specification added thereto.

In step S112, the client receives, as XML data, the property information from the server. In step S113, based on the received property information, the client generates an updating permission form, that is, display information (UI) in which permission of rewriting, addition, and deletion, an allowable data format, and allowable data values can be recognized, and displays the information on the display. The display information is, for example, the content list described with reference to FIG. 15.

In step S114, the user executes data updating of the content information displayed on the display of the client apparatus. After, in step S115, the user transmits the updated information to the server, and updating in the server is completed, in step S116, a response (Ack) as an updating completion report is received and the process ends.

As described above, in the configuration in the present invention, components constituting metadata as content attribute information, that is, editing information allowable for each piece of property information, is transmitted to the client in a form added to XML data, and, in the client apparatus generates, based on the received XML data, a content information list in which an editing permission form for each piece of property information is recognizable is generated and displayed as a user interface. Thus, it is ensured that the user can efficiently execute correct editing for each piece of property information, and characteristic portion data of content is set in a user's favorite data field.

Partial Content Playback Process Flow

Figure 17:
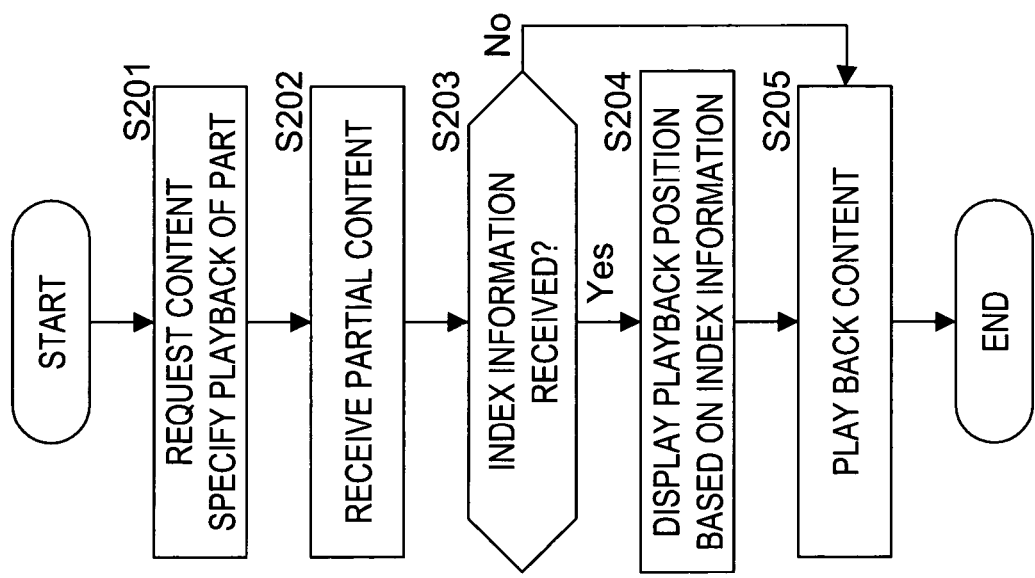
FIG. 17 is a flowchart illustrating a process of a client in the case of executing partial playback of content.

Processing sequences of the client and the server in a partial content playback process are described with reference to the flowcharts in FIGS. 17 and 18.

At first, a procedure of the client is described with reference to FIG. 17. In step S201, the client requests content from the server. This is performed in association with a request in which a content identifier for the server is specified, and, as described above with reference to FIG. 8, the client transmits a content request in a form in which information as partial playback specification is included in request data for the server.

In step S202, the client receives partial content from the server. In step S203, it is determined whether index information has been received as property information corresponding to content together with the received content. If the index information has been received, in step S204, based on the received information, display information in which the playback position and index position described above with reference to FIG. 11 are recognizable is generated and displayed on the display. In step S205, the partial content data received from the server is played back. If the received content is processed by compression such as ATRAC or MPEG, it is decoded before being played back in the client.

Figure 18:
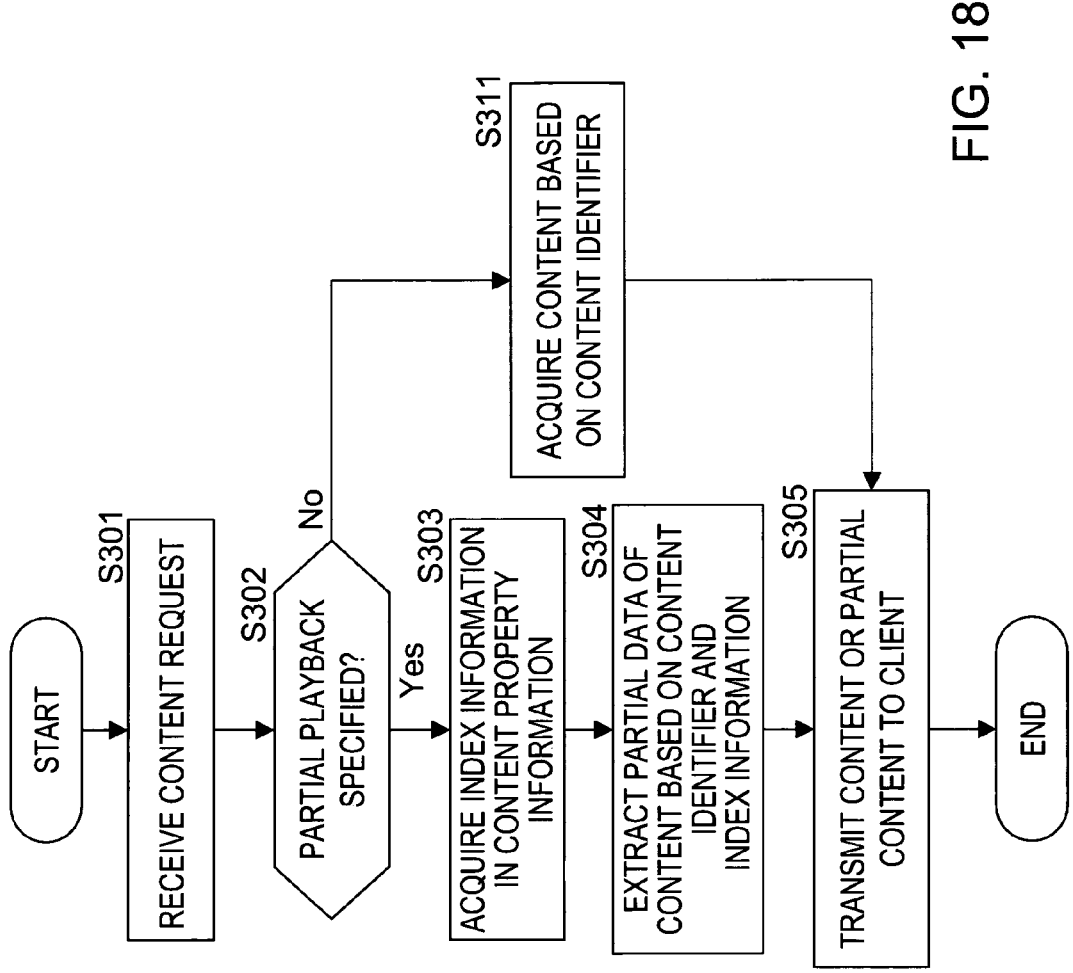
FIG. 18 is a flowchart illustrating a process of a server in the case of executing partial playback of content.

Next, a processing procedure of the server is described based on the flowchart in FIG. 18. After in step S301, the server receives the content request from the client, in step S302, the server determines whether the content request includes partial playback specification.

If the partial playback specification is not included, the server proceeds to step S311. In step S311, the server acquires content in accordance with a content identifier included in the content request, and transmits the acquired content to the client in step S305.

If the partial playback specification is included in the content request, the server proceeds to step S303, and acquires index information from property information of content corresponding to the content identifier included in the content request. In step S304, partial data of the content is extracted in accordance with the content identifier and the acquired index information. In step S305, the extracted partial content is transmitted to the client.

Functional Configurations of Server and Client

The hardware configurations of the server and the client are as described above with reference to FIG. 2. The above-described various types of processing are executed under the control of a control unit (such as a CPU) in accordance with programs stored in the storage units of the server and the client.

Processing executed by the CPU includes, in the server, generating XML data based on property information after acquiring metadata corresponding to content in response to a request from the client, acquiring index information in property information, extracting partial content data based on the index information, and transmitting content. Processing in the client includes displaying content information on the display based on XML data, including property information, received from the server, generating and transmitting a content request packet (see FIG. 8), receiving content, and data conversion and playback of the received content.

Basically, these types of processing are executed under the control of the CPU as the control units of the server and the client. The functional configurations, of the server and the client, required for executing the above-described types of processing are described with reference to FIGS. 19 and 20.

Figure 19:
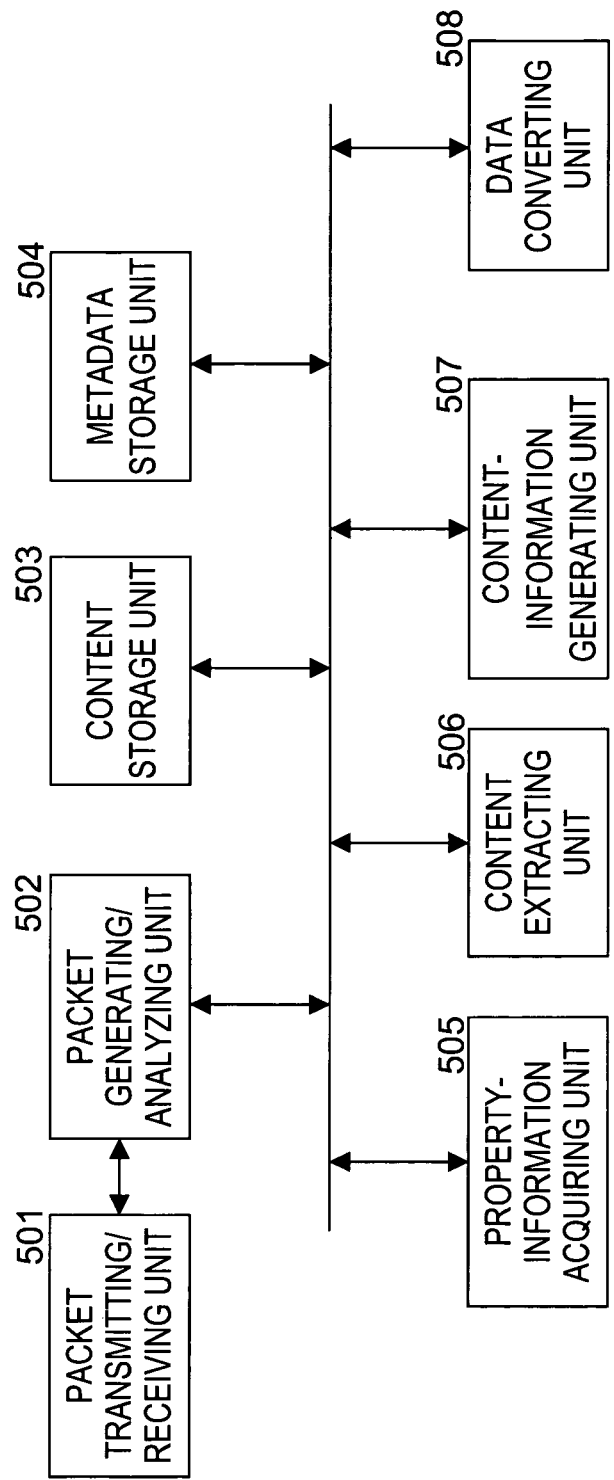
FIG. 19 is a block diagram illustrating processing functions of a server.

FIG. 19 is a block diagram showing a major functional configuration of the server. A packet transmitting/receiving unit 501 receives a packet to the client and a packet from the client. A packet generating/analyzing unit 502 generates a transmitting packet and analyzes a received packet. Its processing includes packet address setting, address recognition, storing data in a data unit, and acquiring data from the data unit.

A content storage unit 503 stores content retained by the server. A metadata storage unit 504 is a storage unit that stores metadata (property information) as attribute information corresponding to content. The property information includes the index information which represents a partial region of content and which is described with reference to FIG. 9.

Based on a property information acquiring request received from the client, for example, a browsing request having the data configuration described above with reference to FIG. 8, a property-information acquiring unit 505 executes acquiring metadata corresponding to a specified folder from the metadata storage unit 504.

When the content request from the client includes partial playback specification, based on index information of property information of corresponding content, a content extracting unit 506 executes extracting partial content data corresponding to the index information.

A content-information generating unit 507 generates XML data as content information on the basis of the metadata acquired by the property-information acquiring unit 505. The content-information generating unit 507 executes not only generating the XML data based on various types of property information when the content information is requested by the client, but also generating XML data based on index information as additional information when partial content is transmitted. A data converting unit 508 executes encoding of transmitting content data, etc., and decoding. For example, it executes data conversion based on ATRAC-3 and MPEG-4.

Next, the functional configuration of the client apparatus is described with reference to FIG. 20. A packet transmitting/receiving unit 601 executes packet transmission to the server and packet reception from the server. A packet generating/analyzing unit 602 performs generating a transmitting packet and analyzing a received packet. The analyzing includes not only analyzing data included in the packet, but also packet address setting, address recognition, storing of data in a data unit, and acquiring data from the data unit.

A content-request processing unit 603 generates content request data (see FIG. 8) to be transmitted to the server. In other words, the content-request processing unit 603 executes generating content request data which includes specifying information concerning whether content playback is to be executed as partial playback as well as content identification information.

A storage unit 604 stores content included in the packet received from the server, content information including index information, etc.

An output unit 605 includes a speaker and a display which are used in playing back content. The display is utilized also for outputting the content playback list and playback partial information described above with reference to FIG. 11. An input unit 606 includes a keyboard and other types of data input means for executing, for example, selecting playback content and inputting editing information for property information, that is, rewriting, addition, and deletion of property information.

A content-information analyzing unit 607 executes analyzing the XML data, including property information, received from the server, generating, based on the analyzed data, for example, the content playback list and partial playback information described above with reference to FIG. 11, outputting the generated list and information on the display as an output unit. In addition, the content-information analyzing unit 607 executes generating display information (see FIG. 15) in which data editing information is recognizable for each piece of property information as a component of the content information received from the server.

A content-playback-control-process unit 608 executes playing back the content or partial content received from the server. When there are plural pieces of playback content, the content-playback-control-process unit 608 determines a content request sequence in accordance with a content playback list, and sequentially sends content URLs in accordance with the playback list to the packet generating/analyzing unit 602. The packet generating/analyzing unit 602 generates a packet in which a content URL is set, and transmits a content request through the packet transmitting/receiving unit 601.

A data converting unit 609 executes various types of data conversion such as decoding the content data received from the server. The data converting unit 609 executes, for example, data conversion based on ATRAC-3 and MPEG-4. The data converting unit 609 may be configured to execute re-coding the decoded data and storing the re-coded data in the content-request processing unit 603.

Figure 20:
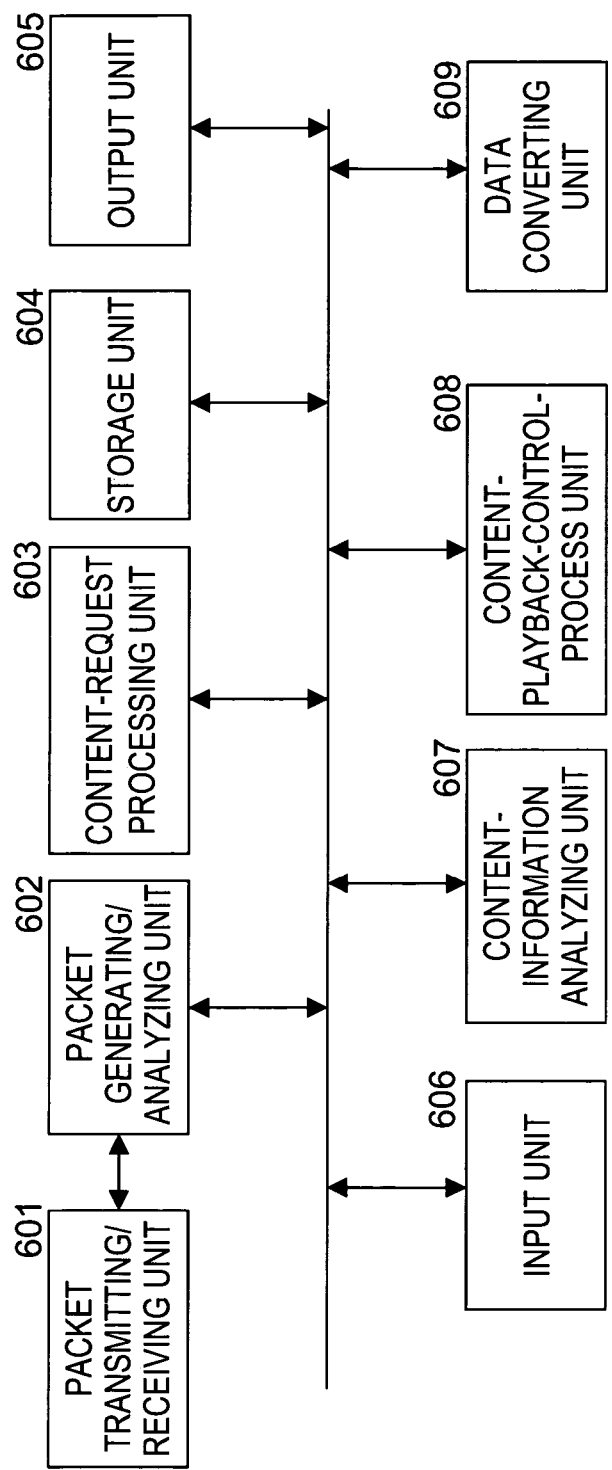
FIG. 20 is a block diagram illustrating processing functions of a client.

The server and the client functionally have the functions shown in FIGS. 19 and 20, respectively, and execute the above-described types of processing. However, the block diagrams shown in FIGS. 19 and 20 illustrate functions. Actually, under the control of the CPU in the hardware configuration of the PC, or the like, shown in FIG. 2, various types of processing programs are executed.

The present invention has been fully described while referring to specific embodiments thereof. However, it is obvious that a person skilled in the art can modify or substitute the embodiments without departing from the gist of the present invention. In other words, the present invention has been disclosed in exemplified form and should not be interpreted in limited sense. To determine the gist of the present invention, the section of Claims should be considered.

Consecutive processing described in this specification can be executed by hardware, software, or a combined form of both. In the case of executing processing by software, the processing can be executed by installing, into a built-in memory of dedicated hardware, a program having a processing sequence recorded therein, or installing the program into a multipurpose computer capable of executing various types of processing.

For example, the program can be recorded beforehand in a hard disk or ROM (Read Only Memory) as a recording medium. Alternatively, the program can be temporarily or eternally stored (recorded) in removable recording media such as a flexible disk, a CD-ROM (Compact Disc Read Only Memory), an MO (Magneto optical) disc, a DVD (Digital Versatile Disc), a magnetic disk, and a semiconductor memory. These removable recording media can be provided as so-called package software.

In addition to the installation of the program from the above removable recording medium into the computer, the program can transferred from a download site to the computer or can be transferred to the computer by wire through a network such as the Internet, and the computer can receive the program transferred as described above and can install the program in a recording medium such as a hard disk.

The various types of processing described in this specification may be not only executed in a time-series manner in accordance with the description, but also executed in parallel or separately in accordance with processing capability of an apparatus that executes the processing or if needed. In addition, the system in this specification is the configuration of a logical set of plural apparatuses, and is not limited to a form in which apparatuses having configurations are in a single apparatus.

INDUSTRIAL APPLICABILITY

As described above, according to the configuration in the present invention, by executing partially extracting content data based on index information included in property information of content by the server on the basis of a partial content playback request from the client, the extracted partial content data is transmitted to the client. Thus, the client can enjoy content playback of particular partial data such as an impressive portion of content received from the server, or user's favorite portion.

In addition, according to the configuration in the present invention, index information of content is set in property information corresponding to content retained by a server, and, in accordance with partial playback specifying information set in a content request from a client, the index information is acquired from the property information corresponding to the specified content, and partial content is transmitted to the client after being acquired. Thus, processing loads on the client and the server are substantially similar to those in normal content transmission, thus enabling efficient partial content playback.

Furthermore, according to the configuration in the present invention, data editing information allowable for each piece of property information is set for each property and the data editing information is transmitted, whereby, in the client, editing of the property information based on received information can be performed and an arbitrary data region, such as a user's favorite portion, can be set as index information. Thus, partial content playback in an arbitrary region can be executed.

The invention claimed is:

1. An information processing apparatus for executing content transmission comprising:
a processor; and
a memory device storing instructions for configuring the processor, wherein the processor is configured by the instructions to:
generate content request data, the content request data including a partial playback identifier indicating that playback of a portion of the content is requested;
transmit the content request data to a server through a Universal Plug and Play (UPnP);
receive, from the server, the content and property information associated with the received content, the property information including a position within the received content of the portion of the content to be played back and a length of the portion of the content to be played back, wherein the property information is expressed in XML within a received UPnP datagram;
generate a graphical user interface based on the property information, the graphical user interface comprising:
a graphical representation of a content list in the form of a table including the received content and the property information, and
a progress bar that indicates a starting position of the portion of the content to be played back and the length of the portion of the content to be played back, wherein both the location of the progress bar within the graphical user interface and the size of the progress bar vary based on the starting position of the portion of the content to be played back and the length of the portion of the content to be played back;
display the graphical user interface to a user, wherein the graphical user interface is configured to receive:
first input from the user for editing the position within the received content of the portion of the content to be played back; and
second input from the user that is distinct from the first input for editing the length of the portion of the content to be played back; and
control playback of the received content such that the portion of the content having the edited position and the edited length is played back.

2. The information processing apparatus according to claim 1, wherein the generated graphical user interface comprises playback-position information that represents a playback position based on an elapse of time from the starting position of the portion of the content to be played back.

3. The information processing apparatus according to claim 2, wherein the playback-position information comprises a playback graphic that moves along the progress bar as time elapses.

4. The information processing apparatus according to claim 1, wherein the property information includes access permissions for at least one of rewriting, addition, or deletion of elements of the property information.

5. The information processing apparatus according to claim 1, wherein the processor is configured by the instructions to update the property information and transmit the updated property information to the server.

6. The information processing apparatus according to claim 5, wherein the processor is configured by the instructions to receive, from the server, a report of updating completion.

7. The information processing apparatus according to claim 1, wherein the content list comprises a plurality of data fields, and wherein the data fields are displayed in different colors.

8. The information processing apparatus according to claim 1, wherein the content includes a plurality of different classes of data, and wherein the generated content request data is based on a single specified class of data.

9. A non-transitory, computer-readable storage medium storing a computer program for causing a client to perform a method for acquiring content, the method comprising:
generating content request data, the content request data including a partial playback identifier indicating that playback of a portion of the content is requested;

transmitting the content request data to a server through a Universal Plug and Play (UPnP);

receiving, from the server, the content and property information associated with the received content, the property information including a position within the received content of the portion of the content to be played back and a length of the portion of the content to be played back, wherein the property information is expressed in XML within a received UPnP datagram;

generating a graphical user interface based on the property information, the graphical user interface comprising:

a graphical representation of a content list in the form of a table including the received content and the property information, and a progress bar that indicates a starting position of the portion of the content to be played back and the length of the portion of the content to be played back, wherein both the location of the progress bar within the graphical user interface and the size of the progress bar vary based on the starting position of the portion of the content to be played back and the length of the portion of the content to be played back;

displaying the graphical user interface to a user, wherein the graphical user interface is configured to receive:

first input from the user for editing the position within the received content of the portion of the content to be played back; and second input from the user that is distinct from the first input for editing the length of the portion of the content to be played back; and controlling playback of the received content such that the portion of the content having the edited position and the edited length is played back.

10. The non-transitory, computer-readable storage medium according to claim 9, wherein the generated graphical user interface comprises playback-position information that represents a playback position based on an elapse of time from the starting position of the portion of the content to be played back.

11. The non-transitory, computer-readable storage medium according to claim 10, wherein the playback-position information comprises a playback graphic that moves along the progress bar as time elapses.

12. The non-transitory, computer-readable storage medium according to claim 9, wherein the property information includes access permissions for at least one of rewriting, addition, or deletion of elements of the property information.

13. The non-transitory, computer-readable storage medium according to claim 9, wherein the method comprises updating the property information and transmitting the updated property information to the server.

14. The non-transitory, computer-readable storage medium according to claim 13, wherein the method comprises receiving, from the server, a report of updating completion.

15. The non-transitory, computer-readable storage medium according to claim 9, wherein the content list comprises a plurality of data fields, and wherein the data fields are displayed in different colors.

16. The non-transitory, computer-readable storage medium according to claim 9, wherein the content includes a plurality of different classes of data, and wherein the generated content request data is based on a single specified class of data.

* * * * *